(12) United States Patent
Ullmann et al.

(10) Patent No.: US 11,389,029 B2
(45) Date of Patent: Jul. 19, 2022

(54) GRINDING DEVICE FOR GRINDING COFFEE BEANS

(71) Applicant: JURA Elektroapparate AG, Niederbuchsiten (CH)

(72) Inventors: Erich Ullmann, Egerkingen (CH); Jodok Gueller, Sursee (CH)

(73) Assignee: JURA Elektroapparate AG, Niederbuchsiten (CH)

( * ) Notice: Subject to any disclaimer, the term of this patent is extended or adjusted under 35 U.S.C. 154(b) by 24 days.

(21) Appl. No.: 16/439,179

(22) Filed: Jun. 12, 2019

(65) Prior Publication Data

US 2019/0380535 A1 Dec. 19, 2019

(30) Foreign Application Priority Data

Jun. 14, 2018 (EP) .................................... 18177786

(51) Int. Cl.
*A47J 42/40* (2006.01)
*A47J 42/06* (2006.01)
(Continued)

(52) U.S. Cl.
CPC ............. *A47J 42/40* (2013.01); *A47J 42/06* (2013.01); *A47J 42/46* (2013.01)

(58) Field of Classification Search
CPC ........ A47J 42/40; A47J 42/06; A47J 42/4638; A47J 42/16; A47J 42/10; A47J 31/42;
(Continued)

(56) References Cited

U.S. PATENT DOCUMENTS

| 4,925,322 A | * | 5/1990 | Hishida | ................. F16C 19/183 384/510 |
| 5,201,474 A | * | 4/1993 | Midden | .................... A47J 42/20 241/246 |

(Continued)

FOREIGN PATENT DOCUMENTS

| DE | 10 2010 017 721 A1 | 12/2010 |
| DE | 11 2016 003 092 T5 | 4/2018 |

(Continued)

OTHER PUBLICATIONS

English translate (WO2017045449A1), retrieved date Nov. 9, 2020.*
(Continued)

*Primary Examiner* — Jessica Cahill
*Assistant Examiner* — Mohammed S. Alawadi
(74) *Attorney, Agent, or Firm* — Collard & Roe, P.C.

(57) ABSTRACT

A grinding device includes: first and second grinding elements, the first grinding element being rotatable relative to the second grinding element around a rotary axis for grinding coffee beans between the grinding elements into a powder; a carrier wheel rotatable around the rotary axis for conveying powder on the carrier wheel to an outflow channel to output the powder; a housing surrounding the grinding elements and the carrier wheel and including the outflow channel, the second grinding element being stationary relative to the housing, a rolling bearing with inner and outer rings and rolling elements therebetween, the outer ring being stationary on the housing and the first grinding element, the carrier wheel and the inner ring being rotatable around the rotary axis together. An annular seal ring seals an intermediate region above the outer ring around the rotary axis between the carrier wheel and the outer ring.

15 Claims, 7 Drawing Sheets

(51) Int. Cl.
*A47J 42/46* (2006.01)
*F16C 33/78* (2006.01)
*F16C 35/063* (2006.01)
*F16C 19/06* (2006.01)
*A47J 42/38* (2006.01)
*A47J 42/16* (2006.01)
*F16C 35/067* (2006.01)
*A47J 31/42* (2006.01)
*A47J 42/08* (2006.01)
*A47J 42/10* (2006.01)

(58) Field of Classification Search
CPC .............. F16C 2314/00; F16C 33/7886; F16C 35/063; F16C 35/067; F16C 19/06
See application file for complete search history.

(56) References Cited

U.S. PATENT DOCUMENTS

| | | | | |
|---|---|---|---|---|
| 9,867,502 | B2* | 1/2018 | Sahli | A47J 31/42 |
| 9,980,610 | B2* | 5/2018 | Sahli | A47J 42/06 |
| 10,010,220 | B2 | 7/2018 | Sahli et al. | |
| 2012/0001005 | A1* | 1/2012 | Kroesen | A47J 42/16 |
| | | | | 241/257.1 |
| 2012/0051680 | A1* | 3/2012 | Ishikawa | F16C 33/6633 |
| | | | | 384/462 |
| 2012/0098208 | A1* | 4/2012 | Yamamoto | F16J 15/3264 |
| | | | | 277/549 |
| 2012/0111141 | A1* | 5/2012 | Shibutani | F16C 13/006 |
| | | | | 74/569 |
| 2013/0163907 | A1* | 6/2013 | Yamamoto | F16C 33/76 |
| | | | | 384/463 |
| 2013/0182984 | A1* | 7/2013 | Masuda | B21K 1/40 |
| | | | | 384/484 |
| 2014/0037239 | A1* | 2/2014 | Duch | F16C 33/7826 |
| | | | | 384/480 |
| 2014/0185975 | A1* | 7/2014 | Furukoshi | F16C 33/7853 |
| | | | | 384/486 |
| 2014/0224910 | A1* | 8/2014 | Sahli | A47J 42/40 |
| | | | | 241/246 |
| 2016/0045071 | A1* | 2/2016 | Sahli | A47J 42/00 |
| | | | | 241/261.2 |
| 2018/0325320 | A1 | 11/2018 | Guo et al. | |
| 2019/0353206 | A1* | 11/2019 | Kitagawa | F16C 33/7886 |
| 2020/0072283 | A1* | 3/2020 | Roberts | F16C 33/6622 |
| 2020/0109745 | A1* | 4/2020 | Seki | F16C 33/805 |
| 2020/0224716 | A1* | 7/2020 | Kitagawa | F16J 15/3232 |

FOREIGN PATENT DOCUMENTS

| | | | |
|---|---|---|---|
| EP | 2 764 808 A1 | 8/2014 | |
| EP | 2 984 973 A1 | 2/2016 | |
| WO | WO-2017045449 A1 * | 3/2017 | ............. A47J 42/38 |

OTHER PUBLICATIONS

Rubber Grommet, retrieved date Nov. 10, 2020.*
Seal, retrieved date Nov. 10, 2020.*
European Office Action dated Sep. 5, 2018 in European Application No. 18177786.3 with English translation of the relevant parts.

* cited by examiner

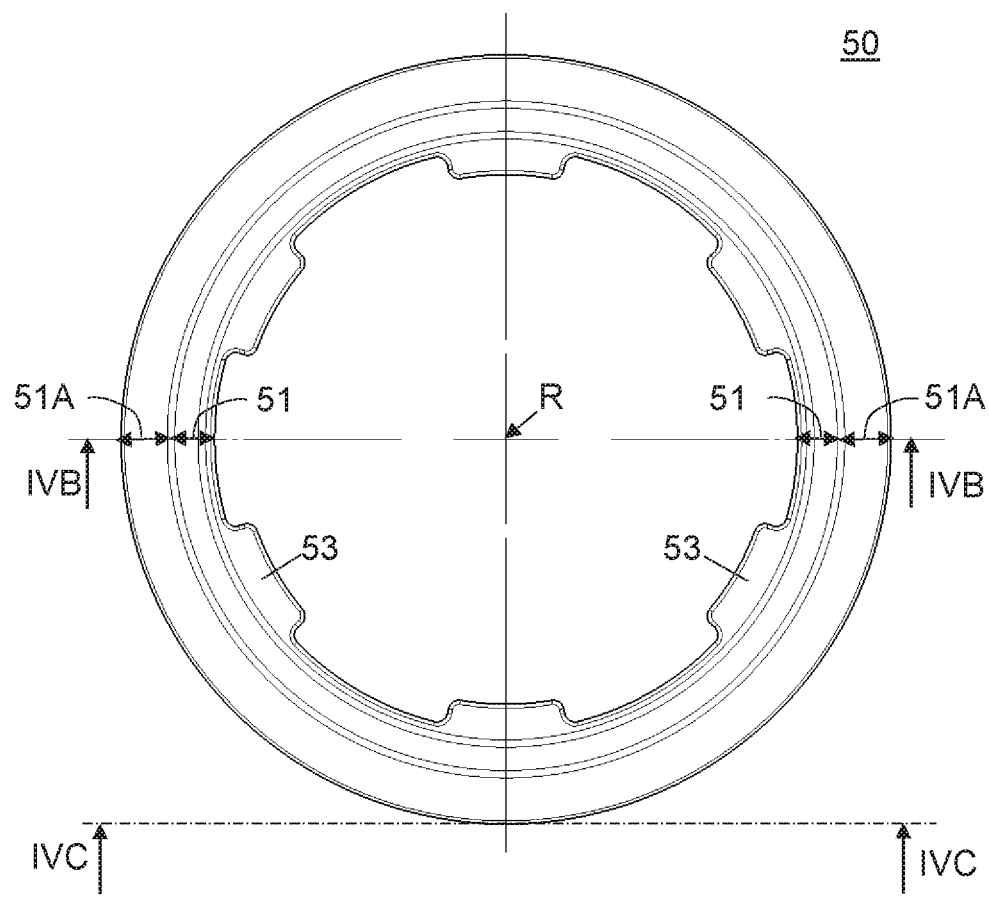
Fig. 4A
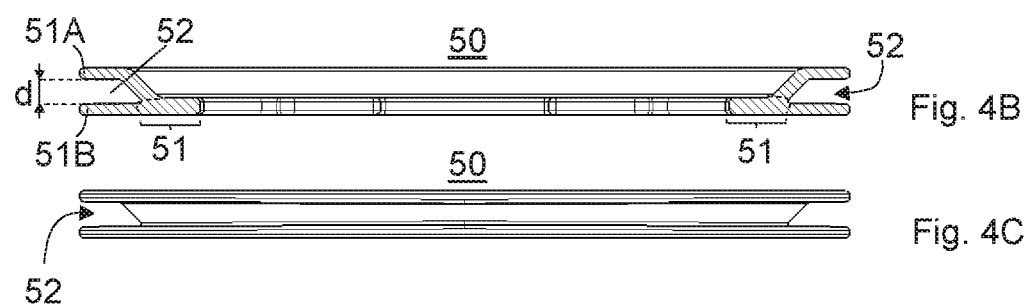
Fig. 4B
Fig. 4C

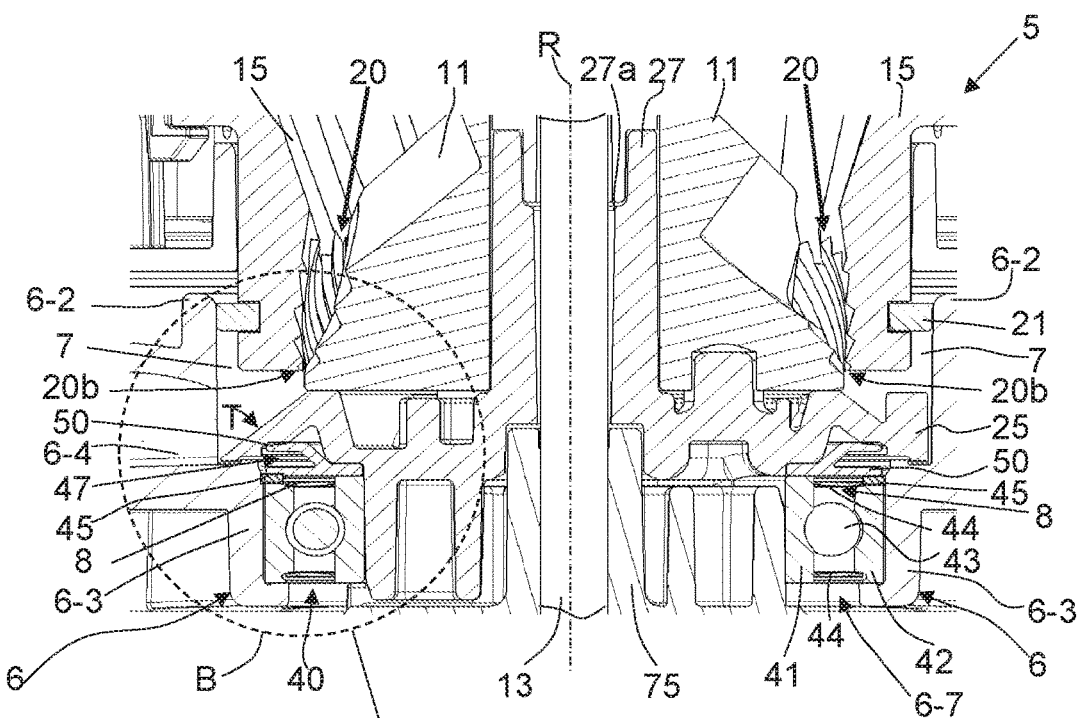
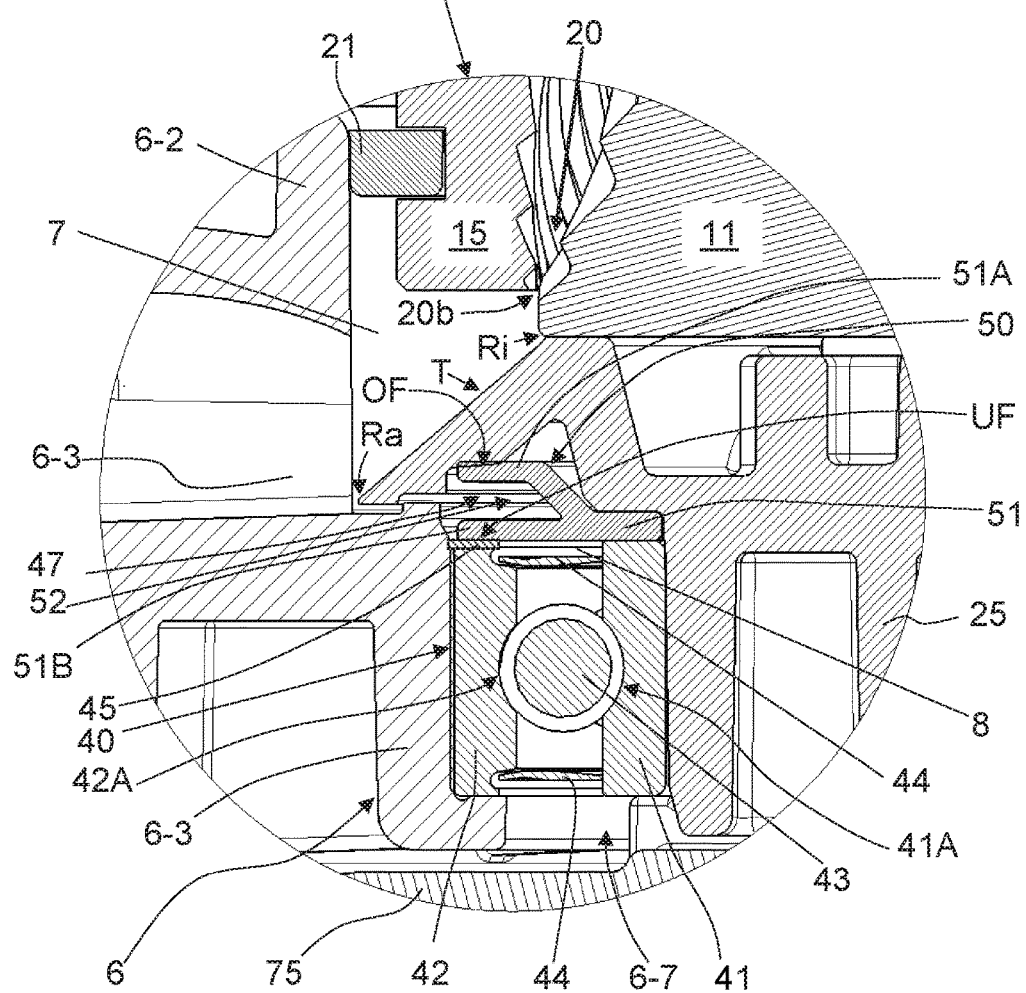
Fig. 7A
Fig. 7B

GRINDING DEVICE FOR GRINDING COFFEE BEANS

CROSS REFERENCE TO RELATED APPLICATIONS

Applicant claims priority under 35 U.S.C. § 119 of European Application No. 18177786.3 filed on Jun. 14, 2018, the disclosure of which is incorporated by reference.

TECHNICAL FIELD

The invention relates to a grinding device for grinding coffee beans.

MOST RECENT BACKGROUND ART

A grinding device of the mentioned type is usually provided in combination with an automated coffee machine; however, it can also be used alone.

A grinding device for grinding coffee beans in accordance with known prior art usually comprises:
- a first grinding element and a second grinding element, wherein the first grinding element can be rotated relative to the second grinding element around a rotary axis in such a way that coffee beans can be ground between the first grinding element and the second grinding element into a coffee powder;
- a carrier wheel, which can be rotated around the rotary axis together with the first grinding element and is arranged in such a way that, in the case of a rotation of the carrier wheel around the rotary axis, the coffee power on an edge region of the carrier wheel can be conveyed through a spatial region designated for the coffee powder to an outflow channel for outputting the coffee powder out of the grinding device;
- a housing, which surrounds the first grinding element, the second grinding element, the carrier wheel and the spatial region designated for the coffee powder and comprises the outflow channel, wherein the second grinding element is arranged in a stationary manner relative to the housing;
- a pivot bearing for mounting the first grinding element and/or the carrier wheel so that the first grinding element and the carrier wheel can be rotated around the rotary axis relative to the housing;
- a seal element that is designed to prevent the coffee powder from advancing from the spatial region designated for the coffee powder into a spatial region under the carrier wheel.

There are various types of grinding devices, which differ with regard to the shape and arrangement of the grinding elements, for example, conical grinders or disk grinders.

So that the coffee beans can be ground between the first grinding element and the second grinding element into a coffee powder, it is necessary that a gap is formed between the first grinding element and the second grinding element, into which the coffee beans must be inserted for the purpose of grinding. This gap is also referred to as a "grinding gap" in the following. Such a grinding gap generally comprises a region, through which entire coffee beans can be inserted into the grinding gap. This region of the grinding gap is also referred to in the following as an "entry gap" for the coffee beans (to be ground). Such a grinding gap also generally comprises a region, through which the coffee powder produced during the grinding process can exit the grinding gap into the spatial region designated for the coffee powder in order to make it possible to convey the coffee powder to the outflow channel with the aid of the carrier wheel. This region of the grinding gap is also referred to in the following as the "outflow gap" for the coffee powder (produced during grinding).

In order to be able to rotate the first grinding element and the carrier wheel around the rotary axis, a grinding device of the aforementioned type can be provided with a drive mechanism comprising a drive motor, which is generally attached to an underside of the housing, which surrounds the first grinding element, the second grinding element and the carrier wheel and is arranged under the carrier wheel in such a way that a drive shaft of the drive motor can be coupled to the carrier wheel and the first grinding element in order to be able to transmit a rotational movement of the drive shaft to the carrier wheel and to the first grinding element.

In EP 2 764 808 A1 or EP 2 984 973 A1, a grinding device of the aforementioned type is disclosed where the drive mechanism comprises a drive motor and a gearbox, wherein the gearbox is arranged between the drive motor and the carrier wheel so that the drive of the gearbox can be propelled by means of the drive shaft of the drive motor and a output of the gearbox is coupled to the carrier wheel and/or the first grinding element in order to be able to transmit a rotational movement of the drive shaft of the drive motor to the carrier wheel and the first grinding element.

With regard to a grinding device of the aforementioned type, a pivot bearing for mounting the first grinding element and/or the carrier wheel is known, which can be implemented as a slide bearing for guiding a common rotary axis of the first grinding element and of the carrier wheel relative to the housing, which surrounds the first grinding element, the second grinding element and the carrier wheel.

In the case of the grinding device disclosed in EP 2 764 808 A1 or EP 2 984 973 A1, a pivot bearing for the first grinding element and the carrier wheel is implemented by means of the fact that the output of the gearbox, which is coupled to the first grinding element and the carrier wheel, is guided by means of a ball bearing, wherein the ball bearing is arranged in a housing of the gearbox and the first grinding element and the carrier wheel are attached to the output of the gearbox. The housing of the gearbox essentially encloses all movable parts of the gearbox so that, in this case, the ball bearing is arranged outside of the housing of the grinding device, which surrounds the first grinding element, the second grinding element and the carrier wheel and therefore mainly provides for a relatively precise guidance of the output of the gearbox with regard to the housing of the gearbox.

The seal element of the grinding device of the aforementioned type has the purpose of enabling the separation between the spatial region surrounded by the housing of the grinding device designated for the coffee powder and a spatial region extending under the carrier wheel. On the one hand, this is supposed to prevent that coffee powder produced during operation of the grinding device from the spatial region designated for the coffee powder can enter into a spatial region under the carrier wheel, which can be provided for the pivot bearing for mounting the first grinding element and/or the carrier wheel and/or for a drive mechanism. In this way, in particular, a dirtying of the pivot bearing and/or of the drive motor and/or a dirtying of a gearbox (that may be available) with coffee powder should be prevented. Furthermore, it should be prevented that undesired substances from a spatial region located under the carrier wheel can advance into the spatial region designated for the coffee powder inside of the housing of the grinding device and, for example, could impair the hygienic conditions within the grinding device and/or the quality of the produced coffee powder.

With regard to a known grinding device of the aforementioned type, it is, for example, usual to design the seal element as a labyrinth seal based on a labyrinth, which can be formed between two parts of the grinding device, which are moved with regard to one another if the carrier wheel is moved around the rotary axis. As an alternative, it is furthermore known (e.g. in accordance with EP 2 764 808 A1 and EP 2 984 973 A1) that the seal element can be a seal ring (typically made of felt), which can be inserted into a gap in a positive-locking manner that extends in a ring-shaped manner around the rotary axis of the carrier wheel and is formed between the carrier wheel and a wall of the housing, which encloses the first grinding element, the second grinding element and the carrier wheel.

However, known grinding devices of the aforementioned type have a series of disadvantages, which can give rise to problems when operating such grinding devices.

Known seal elements, which are formed as labyrinth seals, are regularly not absolutely tight and can therefore not separate the spatial region designated for the coffee powder from the spatial region under the carrier wheel with absolute certainty. Thereby, during operation of grinding devices, it cannot be reliably prevented that the coffee powder dirties the drive mechanism. In this way, a part of the produced coffee powder can enter into the housing of a gearbox arranged under the carrier wheel and, for example, deposit on a ball bearing arranged within the housing of the gearbox with the result that the ball bearing can get blocked up. On the other hand, the gearbox can emit undesired substances (e.g. lubricants), which a seal element formed as a labyrinth seal cannot reliably prevent the advancement of into the spatial region designated for the coffee powder within the housing of the grinding device.

Furthermore, known grinding devices of the aforementioned type show the effect that the first grinding element is burdened with relatively great forces when grinding coffee beans due to the mechanical interactions with the coffee beans and the second grinding element that occur during grinding, which forces are suitable to displace the first grinding element relative to the second grinding element and relative to the housing of the grinding device, and that in such a way that the first grinding element is moved radially and/or axially with regard to the rotary axis. Thereby, the spatial position of the rotary axis, around which the first grinding element is rotated, changes relative to the first grinding element and to the housing of the grinding device as a function of time so that the grinding gap formed between the first grinding element and the second grinding element shows fluctuations with regard to its spatial dimensions and/or its geometrical shape, which can change as a function of time. In this way, in particular, a width of the grinding gap (corresponding to a spacing between the first grinding element and the second grinding element) and/or the geometric shape of the grinding gap can change as a function of time during the grinding process. Such a variable grinding gap usually has disadvantages with regard to the quality of the coffee powder produced.

A further disadvantage relates to the aforementioned seal element, which is formed as a seal ring (typically made of felt) and which can be inserted into a gap in a positive-locking manner, which extends in a ring-shaped manner around the rotary axis of the carrier wheel and is formed between the carrier wheel and a wall of the housing, which encloses the first grinding element, the second grinding element and the carrier wheel. During operation of the grinding device, such a seal ring shows significant signs of wear—caused by a mechanical interaction of the seal ring with the carrier wheel and/or the wall of the housing—thereby resulting in that the seal ring is no longer capable over time of sealing the gap between the carrier wheel and the wall of the housing of the grinding device in a reliable manner.

The publication DE 10 2010 017721 A1 discloses a grinding device for grinding coffee beans that comprises: a first grinding element in the form of a first ring-shaped grinding disk and a second grinding element in the form of a second grinding disk, wherein the first grinding element can be rotated around a rotary axis relative to the second grinding element in such way that coffee beans can be ground between the first grinding element and the second grinding element into a coffee powder; a swivel-mounted carrier wheel, to which the first grinding element is attached and which can be rotated together with the first grinding element around the rotary axis and is arranged in such a way that, when rotating the carrier wheel around the rotary axis, the coffee powder on an edge region of the carrier wheel can be conveyed through a spatial region designated for the coffee powder to an output opening for outputting the coffee powder from the grinding device; a housing, which surrounds the first grinding element, the second grinding element, the carrier wheel and the spatial region designated for the coffee powder, wherein the second grinding element is arranged in a stationary manner relative to the housing. In this case, a rolling bearing is used as a pivot bearing for mounting the first grinding element and/or the carrier wheel, which rolling bearing is designed as an "angular contact bearing", in particular as an "angular contact ball bearing", so that it can receive both axial as well as radial forces. The rolling bearing comprises an inner ring extending around the rotary axis, an outer ring extending around the rotary axis and a plurality of rolling elements arranged between the inner ring and the outer ring, wherein the outer ring is arranged in a stationary manner on the bottom wall of the housing spaced away from the carrier wheel so that an intermediate region extending in a ring-shaped manner around the rotary axis is formed, which extends axially to the rotary axis above the outer ring between a bottom boundary surface and a top boundary surface, wherein the bottom boundary surface of the intermediate region is formed in a stationary manner with regard to the outer ring and the top boundary surface of the intermediate region is arranged in a stationary manner with regard to the carrier wheel, and wherein the first grinding element and the carrier wheel are arranged in a stationary manner relative to the inner ring of the rolling bearing and the inner ring is supported on the outer ring by means of the rolling elements so that the first grinding element, the carrier wheel and the inner ring can be rotated together around the rotary axis. The carrier wheel extends radially to the rotary axis in comparison to the outer ring of the rolling bearing in such a way that the carrier wheel has a diameter perpendicular to the rotary axis, which is greater than a corresponding diameter of the outer ring of the rolling bearing. In order to seal the housing against an escape of coffee powder, a seal ring, preferably a felt ring, is provided. This seal ring is arranged within an annular groove, which extends in a ring-shaped manner around the rotary axis and is formed within the bottom wall of the housing, and that being radially outside of the rolling bearing at a radial spacing to the outer ring of the rolling bearing. The annular groove extends in such a way around the rotary axis that the seal ring abuts the underside of the carrier wheel in the proximity of an outer edge of the carrier wheel when it is inserted into the annular groove. The seal ring is accordingly arranged within a gap between the carrier wheel and the bottom wall of the housing, which extends under the carrier wheel in the proximity of the outer rim of the carrier wheel and, in particular, extends radially outside of the rolling bearing at a radial spacing away from the outer ring of the rolling bearing. During operation of the grinding device, this seal ring also shows significant signs of wear—caused by a mechanical interaction of the seal ring with the carrier wheel and/or the wall of the housing—, thereby resulting in that the seal ring is no longer capable over time to seal the gap between the carrier wheel and the wall of the housing of the grinding device in a reliable manner.

The publication DE 11 2016 003092 T5 discloses a grinding device for grinding coffee beans that comprises: a first grinding element that can be rotated around a rotary axis with the shape of a cone, a second grinding element in the form of a ring that extends around the rotary axis and surrounds the first grinding element, a swivel-mounted carrier wheel, to which the first grinding element is attached, and which can be rotated together with the first grinding element around the rotary axis and by means of which, during a rotation of the carrier wheel around the rotary axis, ground coffee powder on an edge region of the carrier wheel can be conveyed to an output opening for outputting the coffee powder from the grinding device; a housing, which surrounds the first grinding element, the second grinding element and the carrier wheel and comprises the output opening for outputting the coffee powder, wherein the second grinding element is arranged in a stationary manner relative to the housing. A rolling bearing, which comprises an inner ring extending around the rotary axis, an outer ring extending around the rotary axis and a plurality of rolling elements arranged between the inner ring and the outer ring, is used as a pivot bearing for mounting the first grinding element and/or the carrier wheel (similar to the grinding device known from publication DE 10 2010 017721 A1), wherein the outer ring is arranged in a stationary manner on a bottom wall of the housing spaced away from the carrier wheel. The carrier wheel extends radially to the rotary axis in comparison to the outer ring of the rolling bearing in such a way that the carrier wheel has a diameter perpendicular to the rotary axis, which is significantly greater than a corresponding diameter of the outer ring of the rolling bearing. In order to seal the housing against an escape of coffee powder, a seal ring, preferably a wool ring, is provided. This seal ring is arranged within an annular groove, which extends in a ring-shaped manner around the rotary axis and is formed within the bottom wall of the housing, and that being radially outside of the rolling bearing at a radial spacing to the outer ring of the rolling bearing. The seal ring is accordingly arranged within a gap between the carrier wheel and the bottom wall of the housing, which extends under the carrier wheel in the proximity of the outer rim of the carrier wheel and, in particular, extends radially outside of the rolling bearing at a radial spacing away from the outer ring of the rolling bearing. During operation of the grinding device, this seal ring also shows significant signs of wear (similar to a seal ring known from the publication DE 10 2010 017721 A1), thereby resulting in that the seal ring is no longer capable over time of sealing the gap between the carrier wheel and the wall of the housing of the grinding device in a reliable manner.

SUMMARY OF THE INVENTION

The object of the present invention is to avoid the aforementioned disadvantages and to create a grinding device for grinding coffee beans, which can prevent an advancement of coffee powder into a spatial region under the carrier wheel in a more reliable manner.

This task is achieved by means of a grinding device with the features according to the invention.

This grinding device comprises: a first grinding element and a second grinding element, wherein the first grinding element can be rotated around a rotary axis relative to the second grinding element in such way that coffee beans can be ground between the first grinding element and the second grinding element into a coffee powder; a carrier wheel, which can be rotated together with the first grinding element around the rotary axis and is arranged in such a way that, when rotating the carrier wheel around the rotary axis, the coffee powder on an edge region of the carrier wheel can be conveyed through a spatial region designated for the coffee powder to an outflow channel for outputting the coffee powder from the grinding device; a housing, which surrounds the first grinding element, the second grinding element, the carrier wheel and the spatial region designated for the coffee powder and comprises the outflow channel, wherein the second grinding element is arranged in a stationary manner relative to the housing; a pivot bearing for mounting the first grinding element and/or the carrier wheel so that the first grinding element and the carrier wheel can be rotated around the rotary axis relative to the housing, wherein the pivot bearing comprises a rolling bearing, which comprises an inner ring extending around the rotary axis, an outer ring extending around the rotary axis and a plurality of rolling elements arranged between the inner ring and the outer ring, wherein the outer ring is arranged on the housing in a stationary manner spaced away from the carrier wheel so that an intermediate region extending in a ring-shaped manner around the rotary axis is formed, which intermediate region extends above the outer ring axially to the rotary axis between a bottom boundary surface and an top boundary surface, wherein the bottom boundary surface of the intermediate region is formed in a stationary manner with regard to the outer ring and the top boundary surface of the intermediate region is formed in a stationary manner with regard to the carrier wheel and wherein the first grinding element and the carrier wheel are arranged in a stationary manner relative to the inner ring of the rolling bearing and the inner ring is supported on the outer ring by means of the rolling elements so that the first grinding element, the carrier wheel and the inner ring can be rotated together around the rotary axis; a seal element, which extends in a ring-shaped manner around the rotary axis and is designed to prevent coffee powder from advancing out of the spatial region designated for the coffee powder into a spatial region under the carrier wheel.

According to the invention, the seal element is designed as an axial seal ring, which extends through the intermediate region extending in a ring-shaped manner around the rotary axis in such a way that the axial seal ring abuts both the bottom boundary surface of the intermediate region as well as the top boundary surface of the intermediate region.

Due to the fact that the pivot bearing comprises a rolling bearing, the outer ring of which is arranged in a stationary manner on the housing (which encloses the first grinding element, the second grinding element and the carrier wheel) of the grinding device, and due to the fact that the first grinding element and the carrier wheel are arranged in a stationary manner relative to the inner ring of the rolling bearings and the inner ring is supported by means of the rolling elements on the outer ring, it is achieved that the rolling bearing enables a precise guidance of the first grinding element and the carrier wheel with regard to the housing of the grinding device. This guidance causes a stabilization of the spatial position of the rotary axis, around which the first grinding element is rotated during grinding of the coffee beans with regard to the housing of the grinding device and thereby also relative to the second grinding element. Due to this stabilization of the spatial position of the rotary axis with regard to the housing of the grinding device, fluctuations of the grinding gap with regard to its spatial dimensions and/or its geometrical shape are inevitably reduced or prevented.

By means of the fact that the seal element is designed as an axial seal ring and, furthermore, is arranged within an intermediate region that extends in a ring-shaped manner around the rotary axis, which intermediate region extends above the outer ring axially to the rotary axis between a bottom boundary surface and a top boundary surface, it is achieved that the seal element or the axial seal ring is in contact with two boundary surfaces (i.e. the bottom boundary surface and a top boundary surface of the intermediate region), which are directly arranged above the outer ring (in particular, in a projection of the outer ring directed axially to the rotary axis onto the carrier wheel). Due to the fact that the bottom boundary and the top boundary are arranged directly over the outer ring of the rolling bearing, it is ensured that, during a rotation of the carrier wheel around the rotary axis, the top boundary is guided with particularly great precision with regard to the bottom boundary surface so that, during a rotation of the carrier wheel around the rotary axis, the extension of the intermediate region between the bottom boundary surface and the top boundary surface can fluctuate axially to the rotary axis within tolerances, which are particularly low in comparison to prior art (in comparison to prior art in accordance with DE 11 2016 003092 T5 and DE 10 2010 017721 A1, among others). It is therefore possible to place a seal element in the form of an axial seal ring in such a way within the intermediate region above the outer ring of the rolling bearing between the bottom boundary surface and the top boundary surface in such a way that the seal element is exposed to a particularly low level of mechanical stress during a rotation of the carrier wheel around the rotary axis, which ensures a low level of wear and thereby a long lifetime of the seal element.

Due to the arrangement of the aforementioned (axial) seal ring, it is also achieved that, the coffee powder produced during the grinding process cannot pass by the intermediate region formed between the carrier wheel and the outer ring of the rolling bearing in the direction of the rotary axis. In this way, it is prevented that coffee powder can enter through the intermediate region formed between the carrier wheel and the outer ring of the rolling bearing into a spatial region under the carrier wheel, which is limited by the seal ring radially toward the outside. In this way, with the aid of the seal ring, it is particularly prevented that the coffee powder can advance through the intermediate region formed between the carrier wheel and the outer ring of the rolling bearing to the rolling elements and/or to the inner ring of the rolling bearing. The seal ring also makes it possible that a drive mechanism for generating a rotational movement of the inner ring of the rolling bearing, of the first grinding element and/or of the carrier wheel can be arranged in a spatial region under the carrier wheel, thereby ensuring that no coffee powder would be capable of advancing through the intermediate region formed between the carrier wheel and the outer ring of the rolling bearing to the drive mechanism. In this way, the drive mechanism is protected against getting dirty. Furthermore, the seal ring prevents that certain undesired substances (e.g. lubricants), which can be emitted from the rolling bearing and/or from the drive mechanism if applicable, advance through the intermediate region formed between the carrier wheel and the outer ring of the rolling bearing to the spatial region designated for the coffee powder in the housing of the grinding device, thereby being able to contaminate the coffee powder.

The rolling bearing also has the effect that, during the grinding process, the carrier wheel is also precisely guided during the rotation around the rotary axis with regard to the housing of the grinding device and with regard to the outer ring of the rolling bearing with the aid of the rolling bearing. This results in that the rotary axis, around which the carrier wheel rotates during the grinding process, is held in a relatively stable manner with regard to the housing of the grinding device and with regard to the outer ring of the rolling bearing and, consequently, the intermediate region formed between the carrier wheel and the outer ring of the rolling bearing cannot change or, in any case, can only slightly change during the grinding process with regard to its spatial dimensions and/or its geometrical shape as a function of time. In this way, it is possible to select the geometrical shape of the seal ring in such a way that the seal ring is appropriately adapted to the shape of the intermediate region formed between the carrier wheel and the outer ring of the rolling bearing in order to reduce mechanical stresses of the seal ring to a minimum during the grinding process. This results in that the rotary axis, around which the carrier wheel rotates during grinding is held in a relatively stable manner with regard to the housing of the grinding device and with regard to the outer ring of the rolling bearing, in particular, it is achieved that impact-like mechanical stresses of the seal ring can be avoided during the grinding process. The rolling bearing accordingly contributes to being able to avoid the wear and tear of the seal ring to a great extent, which (in comparison to prior art) makes a comparatively long lifetime of the seal ring possible.

In the case of an embodiment of the grinding device, the rolling bearing is designed as a radial bearing, which can at least be radially stressed with regard to the rotary axis. In the case of this embodiment of the rolling bearing, it is at least favorably ensured that, during the grinding process, undesired changes of the spatial position of the first grinding element radially toward the radial access are avoided so that at least spatial fluctuations of the grinding gap are not possible radially to the rotary axis during the grinding process.

As an alternative, the rolling bearing can also be designed as a combined axial/radial bearing, which can be both radially as well as axially stressed with regard to the rotary axis. In the case of this embodiment of the rolling bearing, it is favorably ensured that, during the grinding process, undesired changes of the spatial position of the first grinding element can be avoided both radially as well as axially with regard to the rotary axis. This makes a particularly stable guidance of the first grinding element possible so that spatial fluctuations of the grinding gap are avoided radially and axially to the rotary axis during the grinding process. This embodiment of the rolling bearing consequently makes a particularly strong suppression of grinding gap fluctuations possible during the grinding process. Embodiments of rolling bearings, which are designed as combined axial/radial bearings and, accordingly, can be stressed both radially as well as axially with regard to the rotary axis, are already part of prior art, for example, deep groove ball bearings, cylindrical roller bearings, tapered roller bearings, radial roller bearings, spherical roller bearings or needle bearings. The embodiments of the rolling bearing can be used to implement the aforementioned embodiment of the grinding device.

The seal ring of the grinding device can be designed in accordance with a series of variants, in particular, with regard to its shape and its arrangement relative to the carrier wheel, to the outer ring of the rolling bearing and to the inner ring of the rolling bearing.

In the case of an embodiment of the grinding device, the seal ring, for example, is shaped and arranged in such a way that the seal ring is at least in contact with the carrier wheel and the outer ring of the rolling bearing. This embodiment can be implemented in a particular simple and inexpensive manner. In this case, the bottom boundary surface of the intermediate region can be formed on the outer ring of the rolling bearings and the top boundary surface of the intermediate region can be formed on the carrier wheel.

In the case of another embodiment of the grinding device, the seal ring is shaped and arranged in such a way that the seal ring on a side facing away from the carrier wheel is in contact with the outer ring of the rolling bearing at least along a surface region of the outer ring extending in a ring-shaped manner around the rotary axis. The outer ring of the rolling bearing can generally be shaped and arranged in such a way that it comprises a surface or a surface region on a side facing the carrier wheel, which extends in a ring-shaped manner around the rotary axis and, furthermore, is designed to be level and can be aligned perpendicularly toward the rotary axis. Such a level surface or such a level surface region of the outer ring is preferably suitable as a contact surface for a seal ring. In particular, in this case, the seal ring can have a "simple" geometrical shape: the seal ring can, for example, also have a level surface region on a side that is intended to be brought into contact with the outer ring of the rolling bearing. Furthermore, in this case, the seal ring can be implemented within the grinding device in such a way that it is attached in a stationary manner on the carrier wheel and, during the rotation of the carrier wheel around the rotary axis during the grinding process, it can slide on a level surface or on a level surface region of the outer ring. Here, on the one hand, it is ensured that the seal ring can tightly seal the intermediate region formed between the carrier wheel and the outer ring when sliding on the surface or on the surface region of the outer ring; furthermore, it is implementable here that the sliding of the seal ring on the surface or on the surface region of the outer ring can take place with a low level of friction (in particular, due to an appropriate selection of the respective materials, from which the seal ring and the outer ring are made of).

In the case of another embodiment of the grinding device, the seal ring is shaped and arranged in such a way that the seal ring extends radially to the rotary axis in such a way that the seal ring comprises a section extending in a ring-shaped manner around the rotary axis and being in contact with the inner ring of the rolling bearing. Here, in particular, on a side facing away from the carrier wheel, it is possible that the seal ring is in contact with the inner ring of the rolling bearing at least along a surface region of the inner ring extending in a ring-shaped manner around the rotary axis. In the case of a further development of this embodiment, the seal ring can extend radially to the rotary axis in such a way that it comprises a section extending in a ring-shaped manner around the rotary axis, which is in contact with both the inner ring of the rolling bearing as well as with the carrier wheel. Due to the fact that the seal ring not only seals the intermediate region formed between the carrier wheel and the outer ring of the rolling bearing, but also comprises a section extending in a ring-shaped manner around the rotary axis, which is in contact with the inner ring of the rolling bearing, the entire rolling bearing is separated from the spatial region designated for the coffee powder within the housing of the grinding device in a particularly efficient manner. In this way, coffee powder produced during the grinding process can be prevented particularly effectively from advancing into the regions of the rolling bearing, in which the rolling elements of the rolling bearing are arranged and in which the rolling elements of the rolling bearing are in contact with a surface of the outer ring or with a surface of the inner ring. Furthermore, due to its arrangement, the aforementioned seal ring prevents that lubricants advancing out of the regions of the rolling bearing, in which the rolling elements of the rolling bearing are arranged, can reach the carrier wheel or the spatial region designated for the coffee powder within the housing of the grinding device.

In another embodiment of the grinding device, the seal ring comprises a base section extending in a ring-shaped manner around the rotary axis, a first sealing lip, which is connected to the base section and extends from the base section radially toward the outside, and a second sealing lip, which is connected to the base section and extends from the base section radially toward the outside. Furthermore, in the case of this embodiment, the first sealing lip and the second sealing lip are arranged relative to one another in such a way that the first sealing lip has a spacing to the second sealing lip axially to the rotary axis on a region distanced away from the base section. In this case, the first sealing lip and the second sealing lip extend radially to the rotary axis in such a way that these sealing lips are spatially separated on their ends distanced away from the rotary axis in the direction of the rotary axis (i.e. axially).

In the case of a seal ring of the aforementioned type, the first sealing lip can be arranged in such a way that it is in contact with the carrier wheel and the second sealing lip can be arranged in such a way that it is in contact with the outer ring of the rolling bearing. A seal ring of the aforementioned type can, in particular, be formed in such a way that the first sealing lip is in contact with the carrier wheel at least along a surface region of the carrier wheel extending in a ring-shaped manner around the rotary axis, and/or the second sealing lip is in contact with the outer ring of the rolling bearing at least along a surface region of the outer ring extending in a ring-shaped manner around the rotary axis.

In the case of a seal ring of the aforementioned type, due to the fact that both sealing lips (i.e. the first sealing lip and the second sealing lip) are spatially separated on their ends distanced away from the rotary axis in the direction of the rotary axis (i.e. axially), a free space is formed between the first sealing lip and the second sealing lip, which is radially limited toward the inside by the base section and is open radially toward the outside toward the spatial region designated for the coffee powder. If during the grinding process a part of the produced coffee powder advances into this free space between the first sealing lip and the second sealing lip and should possibly fill this free space, the coffee powder having advanced into this free space generates forces, which act on the first sealing lip and/or the second sealing lip, and that being in such a way that the first sealing lip is pressed against the carrier wheel and/or in such a way that the second sealing lip is pressed against the outer ring of the rolling bearing. This has the effect that the first sealing lip is pressed against the carrier wheel with an increased pressure or rather with an increased pressing force and/or the second sealing lip is pressed against the outer ring of the rolling bearing with an increased pressure or rather with an increased pressing force. A seal ring of the aforementioned type therefore has the advantage that coffee powder advancing into the free space between the first sealing lip and the second sealing lip increases the sealing effect of the seal ring. The seal ring therefore makes a particularly effective sealing of a spatial region extending under the carrier wheel possible.

In a further development of a seal ring of the aforementioned type, it is additionally provided that the base section is arranged in such a way that it is in contact with the carrier wheel and/or with the inner ring of the rolling bearing. This measure is suitable for additionally improving the sealing effect of the seal ring.

In all the aforementioned embodiments of the grinding device, the seal ring can be arranged in a stationary manner with regard to the carrier wheel. In this case, the seal ring is moved relative to the housing of the grinding device and, in particular, relative to the outer ring of the rolling bearing during the grinding process.

Preferably, the seal ring is made of a plastic material (e.g. Teflon). On the basis of a plastic material, appropriate seal rings can be made available, which show a low level of sliding friction and a low level of wear in the case of use within one of the aforementioned grinding devices and which can be produced in an inexpensive manner.

The grinding device can be implemented in combination with a drive mechanism for generating a rotational movement of the inner ring of the rolling bearing, of the first grinding element and/or of the carrier wheel around the rotary axis, wherein the drive mechanism can be arranged under the carrier wheel.

BRIEF DESCRIPTION OF THE DRAWINGS

Further details of the invention and, in particular, exemplary embodiments of the device according to the invention are explained in the following based on the enclosed drawings. The figures show:

FIG. 4A the seal ring in accordance with FIG. 2 in a top view;

FIG. 4B the seal ring in accordance with FIG. 2 in a cross-section along the line IVB-IVB in accordance with FIG. 4A;

FIG. 4C the seal ring in accordance with FIG. 2 in a lateral view perpendicular to the line IVC-IVC in accordance with FIG. 4A;

FIG. 7A a variant of the grinding device in accordance with FIG. 1 with a modified arrangement of the rolling bearing and the first embodiment of the seal ring, shown in a cross-section along the plan E1 in accordance with FIG. 1;

FIG. 7B a section from FIG. 7A, corresponding to a part of FIG. 7A, which is limited by a circular line provided with reference letter B in FIG. 7A in an enlarged view.

DESCRIPTION OF THE EMBODIMENTS

The same reference numbers are used for the same elements in the figures if nothing else is mentioned.

Figure 1:
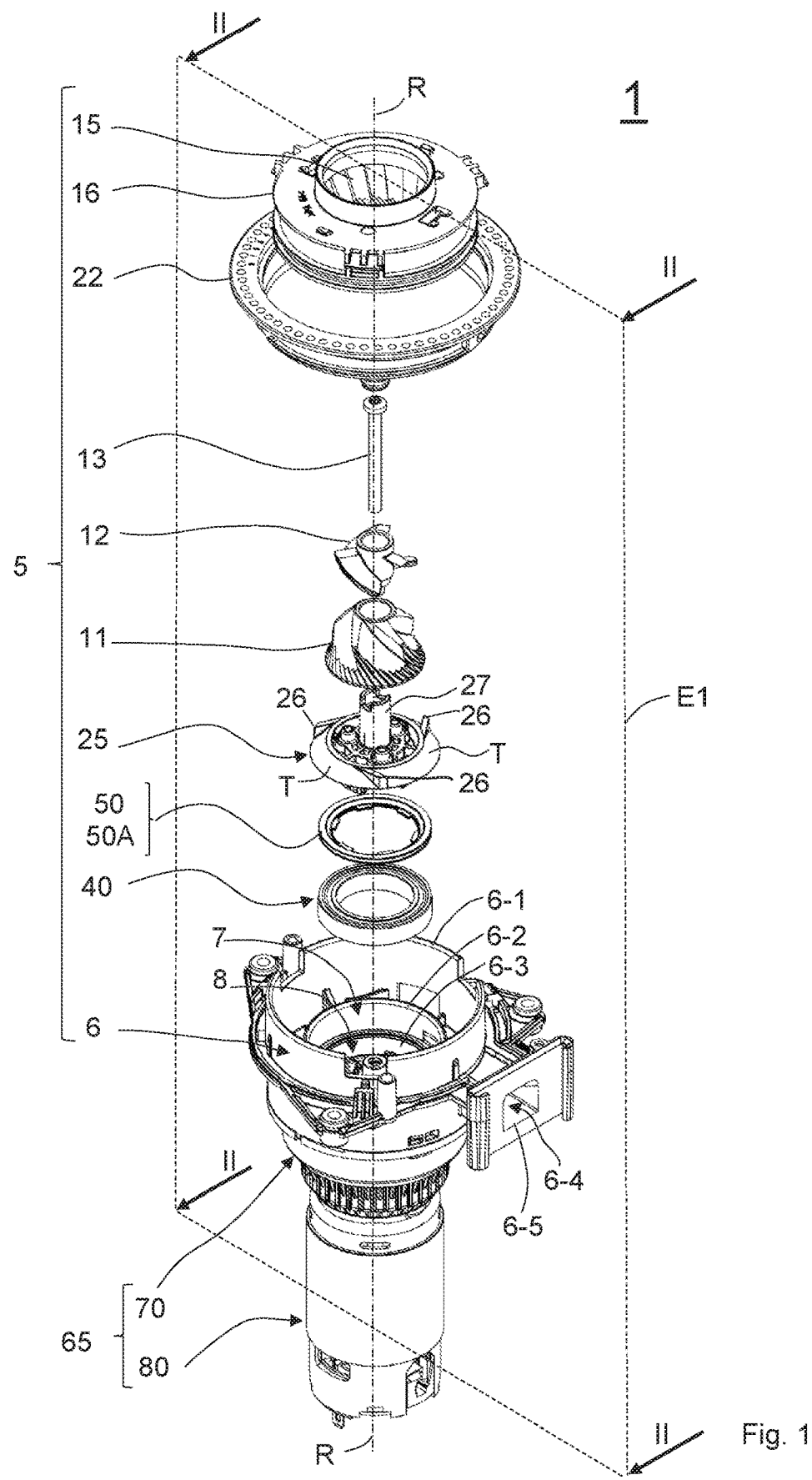
FIG. 1 an exploded view of a grinding device in combination with a drive mechanism.

In FIG. 1 (in a perspective manner and in an exploded view), a grinder 1 for grinding coffee beans is shown, which consists of a grinding device 5 and a drive mechanism 65 comprising a gearbox 70 and a drive motor 80.

The grinding device 5 comprises a first grinding element 11, a second grinding element 15 and a carrier wheel 25, wherein these parts are surrounded by a housing 6, which comprises an outflow channel 6-4 with an outlet opening 6-5 for outputting coffee powder. The first grinding element 11 can be rotated relative to the second grinding element 15 around a rotary axis R in such a way that coffee beans are ground between the first grinding element 11 and the second grinding element 15 into a coffee powder.

The grinder 1 is designed as a "conical grinder" in the present example. Accordingly, the first grinding element 11 of the grinding device 5 is designed as a grinding cone with a shell surface, which is structured in such a way that it comprises a plurality of edges that are suitable for grinding coffee beans, thereby extending in a screw-shaped manner around the rotary axis R. Accordingly, the second grinding element 15 of the grinding device 5 is designed as a grinding ring, which extends around the rotary axis R in a ring-shaped manner and comprises a surface facing the rotary axis R. This surface facing the rotary axis R of the second grinding element 15 is structured in such a way that it also has a plurality of edges, which are suitable for grinding coffee beans.

In the order from the grinding element 11 to the top, a rotatable conveying element 12 (in the present example, designed as a screw), an attachment screw 13, a carrier 16 for the second grinding element 15 and an adjustment ring 22 for the carrier 16 are provided.

The carrier wheel 25 can be rotated together with the first grinding element 11 around the rotary axis R and comprises a disk-shaped region extending radially to the rotary axis R, which comprises an edge region T extending in a ring-shaped manner around the rotary axis R on a top side (facing the first grinding element 11 and the second grinding element 15), on which the coffee powder produced during operation of the grinder 1 can be conveyed during a rotation of the carrier wheel 25 around the rotary axis R to the outflow channel 6-4 in order to make an output of the produced coffee powder from the grinding device 5 through the outlet opening 6-5 possible. The carrier wheel 25 furthermore comprises an elongated sleeve 27 in the middle of the disk-shaped region, which extends along the rotary axis R upwardly and comprises a drill hole 27a extending along the rotary axis R. As will still be explained in the following in connection with FIGS. 2, 3A and 3B, the sleeve 27 is essentially used to establish a mechanical connection between the carrier wheel 25, the first grinding element, the conveying element 12 and the drive mechanism 65. In order to make an efficient conveyance of coffee powder with the aid of the carrier wheel 25 possible, a plurality of carrier blades 26 are arranged on the edge region T of the carrier wheel, which extend upwardly in an axial direction and radially toward the outside—with regard to the rotary axis R. Each of the carrier blades 26 is suitable due to its arrangement with regard to the rotary axis R to carry coffee powder on the edge region T into a direction corresponding to the rotational direction of the carrier wheel 25 when rotating the carrier wheel 25 and thereby, being suitable to convey it through a spatial region extending around the rotary axis R in the rotational direction of the carrier wheel 25.

As is furthermore indicated in FIG. 1, the grinding device 5 comprises a rolling bearing 40, which is used as a pivot bearing for the carrier wheel 25, the first grinding element 11 and/or the conveying element 12. Furthermore, a seal ring is available, for example, a seal ring 50 in accordance with a first embodiment or a seal ring 50A in accordance with a second embodiment.

Further details of the grinding device 5, the drive mechanism 65, the rolling bearing 40 and the seal ring 50 will be described in the following in connection with FIGS. 2, 3A, 3B, 4A, 4B and 4C; further details of the grinding device 5, the rolling bearing 40 and the seal ring 50A will be explained in the following in connection with FIGS. 5A, 5B, 6A, 6B and 6C.

Figure 2:
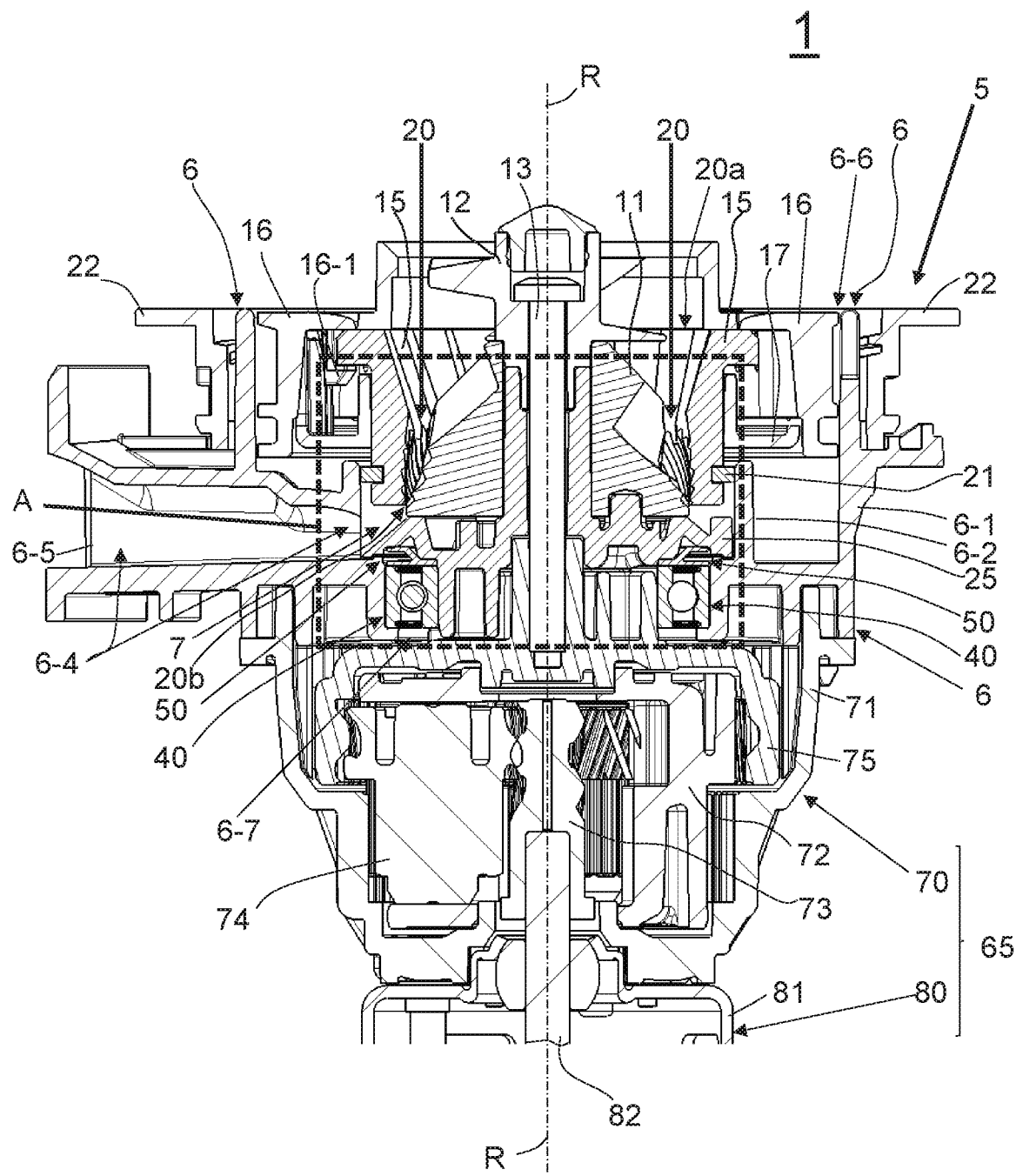
FIG. 2 the grinding device in accordance with FIG. 1 with a rolling bearing and a first embodiment of a seal ring, shown in a cross-section along the plane µl in accordance with FIG. 1 in a view in the direction of the arrows provided with the reference number II in accordance with FIG. 1.
Figure 3A:
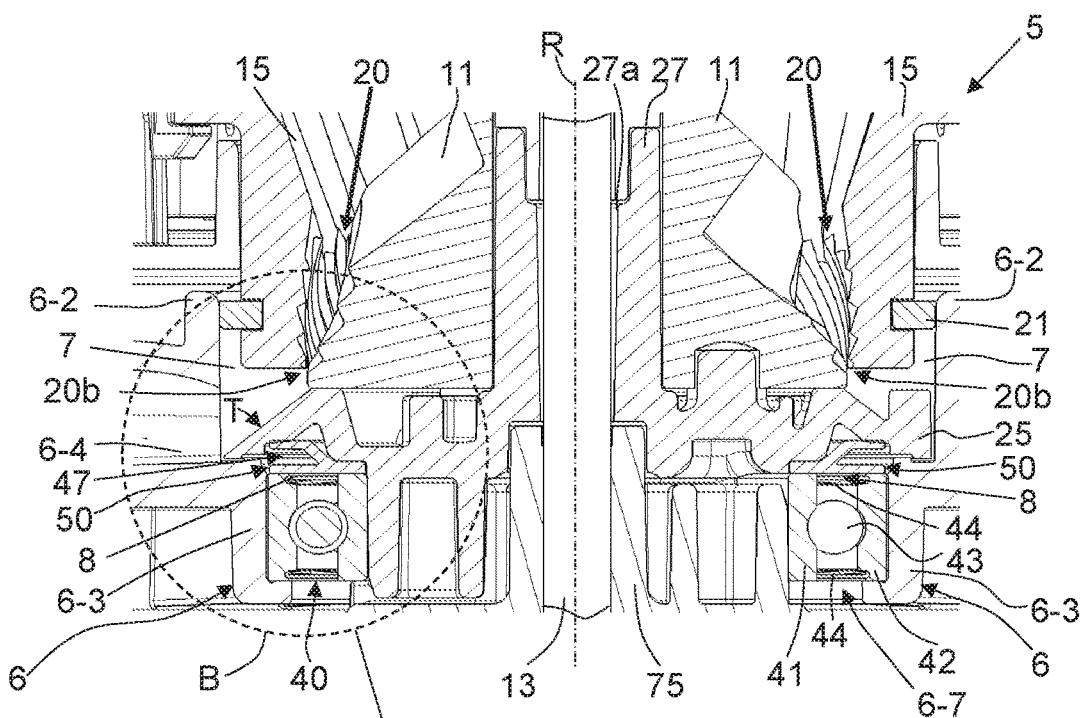
FIG. 3A a section from FIG. 2, corresponding to a part of FIG. 2, which is limited by a rectangle provided with the reference letter A in FIG. 2 in an enlarged view.
Figure 3B:
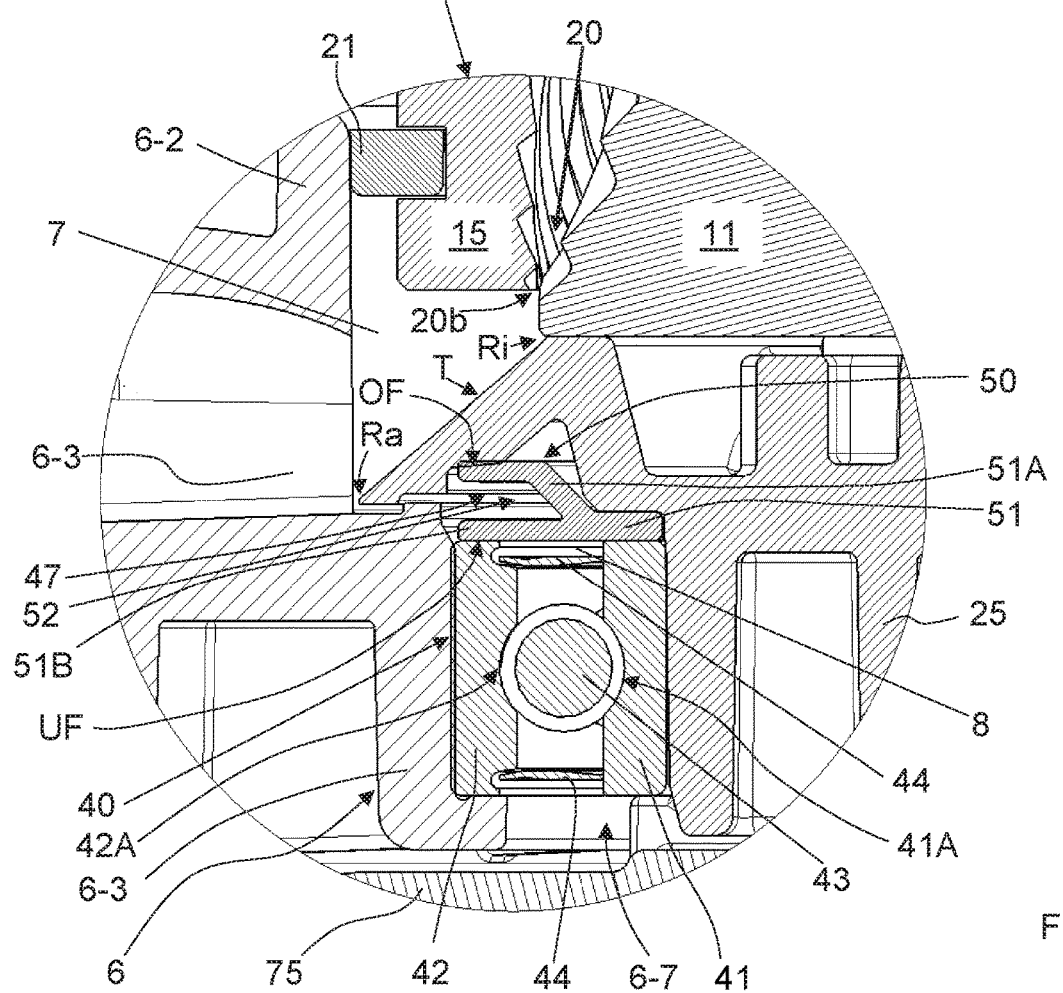
FIG. 3B a section from FIG. 3A, corresponding to a part of FIG. 3A, which is limited by a circular line provided with reference letter B in FIG. 3A in an enlarged view.

As is evident from FIGS. 2, 3A and 3B, the housing 6 of the grinding device 5 comprises a top opening 6-6 and a bottom opening 6-7, through which openings an interior space limited by the housing 6 is accessible from the top or from the bottom. The top opening 6-6 serves to mount various components of the grinding device 5 from the top in the interior space limited by the housing 6 during assembly of the grinding device 5 or to bring the coffee beans to be ground from the top into the interior space when operating the grinding device 5. The bottom opening 6-7 makes it possible to establish a connection between the drive mechanism 65 placed under the housing 6 and those components of the grinding device 5 placed in the interior space, which should be propelled with the aid of the drive mechanism 65.

As is evident from FIGS. 1 and 2, the housing 6 comprises various walls and wall regions (e.g. walls or wall regions 6-1, 6-2 and 6-3), which are used to spatially structure the interior space limited by the housing 6 in order to create chambers, which offer space for various components of the grinding device 5. In particular, the housing 6 comprises a first (outer) wall 6-1, which limits the upper opening 6-6 and also forms an outer boundary of the interior space. The first wall 6-1 essentially extends in a ring-shaped manner around the rotary axis R and encloses a spatial region bordering the top opening 6-6, which offers space for arranging the conveying element 12, the first grinding element 11, the second grinding element 15 and the carrier 16 for the second grinding element.

The second grinding element 15 is held in a stationary manner with regard to the housing 6 with the aid of the carrier 16. For this purpose, the carrier 16 comprises snap elements 16-1 for holding the second grinding element 15. An attachment ring 17 is fixed to the carrier 16 in order to lock the snap elements 16-1 so that the second grinding element 15 is firmly held on the carrier 16. The adjustment ring 22 is swivel-mounted to the housing 6 around the rotary axis R and is mechanically coupled to the carrier 16 in such a way that the carrier 16 with the second grinding element 15 is displaceable upwardly or downwardly in the direction of the rotary axis R by rotating the adjustment ring 22 around the rotary axis R. In this way, the arrangement of the second grinding element 15 can be changed relative to the first grinding element 11 so that the grinding degree of the coffee powder to be produced can be adjusted.

The first grinding element 11 is arranged in a centered manner with regard to the second grinding element 15 in such a way that the second grinding element 15 extends in a ring-shaped manner around the first grinding element 11 spaced away from the first grinding element 11 and thereby, a grinding gap 20 is formed between the first grinding element 11 and the second grinding element 15, in which coffee beans can be ground between the first grinding element 11 and the second grinding element 15 into a coffee powder if the first grinding element 11 is rotated around the rotary axis R relative to the second grinding element 15. In order to be able to insert coffee beans into the grinding gap 20, the grinding gap 20 is shaped in such a way that it comprises a region extending in a ring-shaped manner around the rotary axis R on an upper end, which is used as an entry gap 20a for coffee beans, wherein a width of the entry gap 20a is selected in such a way that whole coffee beans can pass through the entry gap 20a. Furthermore, the grinding gap 20 is shaped in such a way that it comprises a region extending in a ring-shaped manner around the rotary axis R on an end distanced away from the entry gap 20a, which region is used as an outflow gap 20b for coffee powder so that coffee powder produced in the grinding gap 20 during grinding must exit the grinding gap 20 through the outflow gap 20b, wherein a width of the outflow gap 20b limits the grain size of the coffee powder, thereby defining the grinding degree of the produced coffee powder.

The rotatable conveying element 12 serves to convey coffee beans fed through the opening 6-6 along the rotary axis R through the entry gap 20a into the grinding gap 20 between the first grinding element 11 and the second grinding element 15.

As is furthermore evident from FIGS. 2, 3A and 3B, the grinding gap 20 is connected to a spatial region 7 of the interior space surrounded by the housing 6 via the outflow gap 20b, which spatial region 7 is provided for produced coffee powder and through which the coffee powder must be conveyed in order to reach the outflow channel 6-4 and the outlet opening 6-5. The spatial region 7 provided for the coffee powder is limited toward the top by the first grinding element 11 and the second grinding element 15 and is limited radially toward the outside by a second wall 6-2, which extends in the interior space surrounded by the housing 6 in a ring-shaped manner around the rotary axis R at a distance from the bottom opening 6-7 of the housing 6. The spatial region 7 is furthermore downwardly limited by the carrier wheel 25 and, in particular, by the edge region T of the carrier wheel 25. For this purpose, the carrier wheel 25 is arranged in a movable manner with regard to the first grinding element 11 and the second wall 6-2 in such a way that the disk-shaped region of the carrier wheel 25 extending radially to the rotary axis is arranged under the first grinding element 11 and, furthermore, the edge region T of the carrier wheel 25 extends radially to the rotary axis R in such a way that an inner edge Ri of the edge region T is located directly under the outflow gap 20b and that an outer edge Ra of the edge region T is located "close" to the second wall 6-2 (i.e. at least spaced away from the second wall 6-2, which makes it possible that the carrier wheel 25 is rotatable around the rotary axis R and is thereby movable relative to the second wall 6-2).

As is furthermore indicated in FIGS. 2, 3A and 3B, the second wall 6-2 comprises an opening, which connects the spatial region 7 to the outflow channel 6-4 so that coffee powder can enter into the outflow channel 6-4 radially toward the outside out of the spatial area 7 and can ultimately exit the grinding device 5 through the outlet opening 6-5.

As is furthermore evident from FIGS. 2, 3A and 3B, the interior space surrounded by the housing 6 comprises another spatial region, which is arranged under the spatial region limited by the second wall 6-2, extends downwardly up to the bottom opening 6-7 of the housing 6 and is limited by a third wall 6-3 radially toward the outside, which third wall 6-3 extends in a ring-shaped manner around the rotary axis R. The spatial region limited by the third wall 6-3 offers space for arranging the rolling bearing 40 among other things.

As is evident from FIGS. 2, 3A and 3B, the rolling bearing 40 comprises an inner ring 41 extending around the rotary axis R, an outer ring 42 extending around the rotary axis R and a plurality of rolling elements 43 arranged between the inner ring 41 and the outer ring 42, wherein the outer ring 42 is arranged in a stationary manner on the housing 6 spaced away from the carrier wheel 25 so that an intermediate region 47 is formed between the carrier wheel 25 and the outer ring 42 of the rolling bearing 40. The rolling bearing 40 is placed in the present example in such a way that the outer ring 42 borders the third wall 6-3 radially toward the outside and the inner ring 41 is accessible through the bottom opening 6-7 of the housing 6.

In the present example, the rolling bearing 40 is designed as a deep groove ball bearing. The rolling elements 43 are designed as balls accordingly. Furthermore, the inner ring 41 and the outer ring each comprise a groove adapted to the shape of the rolling elements on a side facing the rolling elements 43, in which groove the rolling elements 43 are guided if the inner ring 41 relative to the outer ring 42 is rotated around the rotary axis R. For this purpose, a groove 41A extending around the rotary axis R is formed on a surface region of the inner ring 41 facing away from the rotary axis R; accordingly, a groove 42A extending around the rotary axis R is formed on the surface region of the outer ring 42 facing the rotary axis R. The grooves 41A and 42A are arranged here relative to the rolling elements 43 in such a way that, when rotating the inner ring 41 around the rotary axis, the rolling elements 43 are forced to continuously roll off on a track surrounding the rotary axis R in a ring-shaped manner on the inner ring 41 or the outer ring 42 in groove 41A or in groove 42A. In the present example, the rolling bearing 40 is designed as a combined axial/radial bearing, which can be stressed both radially as well as axially with regard to the rotary axis R.

In order to protect the grooves 41A, 42A and the rolling elements 43 of the rolling bearing 40 against dirtying and, if applicable, to keep back lubricant that is present in the grooves 41A, 42A or on the rolling elements 43, the rolling bearing 40 in the present example is equipped with two ring-shaped sealing disks 44, which are arranged in an intermediate region between the inner ring 41 and the outer ring 42 relative to one another at an axial spacing with regard to the rotary axis R so that both sealing disks 44 are placed at two opposites sides of the grooves 41A, 42A or of the rolling element 43 (in the present example, above and below the grooves 41A, 42A or of the rolling elements 43) (FIG. 3B).

As is evident from FIGS. 2 and 3A, the drive mechanism 65 is arranged on an underside of the housing 6, wherein the gearbox 70 of the drive mechanism 65 is placed directly at the bottom opening 6-7 of the housing 6.

In the present example, the gearbox 70 is designed as a conventional planetary gear and comprises a gearbox housing 71, which surrounds a plurality of movable parts of the gearbox 70: a sun gear 73 that can be rotated around a longitudinal axis, a planetary carrier 72, on which a plurality (for example three) planetary wheels 74 are rotatably attached, a ring gear 75, which has an internal toothing. Here, the sun gear 73, the planetary wheels 74 and the ring gear 75 conventionally interact together in such a way that the sun gear 73 transmits a rotation around its longitudinal axis to the planetary wheels 74 and each of the planetary wheels 74 transmits a rotation of the respective planetary wheel 74 around its rotary axis to the ring gear 75. The sun gear 73 therefore functions as a drive of the gearbox 70 and the ring gear 75 functions as an output of the gearbox 70.

In order to propel the sun gear 73, the drive motor 80 is arranged under the gearbox 70. The drive motor 80 comprises a separate housing 81, which is held in a stationary manner on the gearbox housing 71, wherein a drive shaft 82 of the drive motor 80 is rigidly connected to the sun gear 73 so that the sun gear 73 can be rotated synchronously with the drive shaft 82 of the drive motor 80.

As is indicated in FIGS. 2 and 3A, the gearbox 70 is arranged in such a way that the sun gear 73 and the ring gear 75 can be rotated around the rotary axis R. The carrier wheel 25 is rigidly connected to the inner ring 41 of the rolling bearing so that the carrier wheel 25 can be rotated synchronously with the inner ring 41 around the rotary axis R and, in the case of such a rotation, is guided with great precision by means of the rolling elements 43 on the outer ring 42 of the rolling bearing 40.

As is furthermore indicated in FIGS. 2 and 3A, the conveying element 12, the first grinding element 11 and the ring gear (or the output) of the gearbox 70 are also rigidly connected to the carrier wheel 25 and the inner ring 41 of the rolling bearing 40. The ring gear 75, the carrier wheel 25, the first grinding element 11 and the conveying element 12 are thereby—in this order—successively arranged along the rotary axis R. The ring gear 75, the carrier wheel 25, the first grinding element 11 and the conveying element 12 are thereby complementarily shaped in such a way that the ring gear 75, the first grinding element 11 and the conveying element 12 can be connected to the carrier wheel 25 in a positive-locking manner. For this purpose, the first grinding element 11 comprises a central drill hole, which extends along the rotary axis R and is shaped in such a way that the sleeve 27 of the carrier wheel 25 can be inserted from the underside of the first grinding element 11 into the central drill hole of the first grinding element 11 in a positive-locking manner, and that being in such a way that the conveying element 12 on the top end of the sleeve 27 can be inserted into the drill hole 27a, which is formed within the sleeve 27 along the rotary axis R, in a positive-locking manner. The ring gear 75, in turn, is shaped in such a way that at least one section of the ring gear 75 can be inserted from the underside of the carrier wheel 25 into the drill hole 27a in the carrier wheel 25 in a positive-locking manner.

As is furthermore indicated in FIGS. 2 and 3A, the ring gear 75, the carrier wheel 25, the first grinding element 11 and the conveying element 12 are connected by means of the screw 13 into a rigid assembly, which can be rotated in its entirety together with the inner ring 41 of the rolling bearing relative to the housing 6 around the rotary axis R. The ring gear 75, the carrier wheel 25, the first grinding element 11 and the conveying element 12 are formed for this purpose in such a way that the screw 13 can be inserted through continuous drill holes, which extend through the conveying element 12, the first grinding element 11 and the carrier wheel 25 along the rotary axis R up until the ring gear 75 so that the screw 13 can be screwed onto a thread (not shown in the figures) formed on the ring gear 75 in order to firmly clamp the conveying element 12, the first grinding element 11 and the carrier wheel 25 to the ring gear 75.

Since the inner ring 41 is guided on the outer ring 42 of the rolling bearing 40 by means of the rolling elements 43, the conveying element 12, the first grinding element 11, the carrier wheel 25 and the ring gear 75 are precisely guided when rotating around the rotary axis R thanks to the rolling bearing 40 with regard to the housing 6 and thereby with regard to the second grinding element 15.

While the grinder 1 is operating, initially, whole coffee beans are brought through the entry gap 20a into the grinding gap 20 between the first grinding element 11 and the second grinding element 15 and the ring gear 75, the carrier wheel 25, the first grinding element 11 and the conveying element 12, by means of the drive motor 80, are caused to rotate together synchronously around the rotary axis R. Here, the coffee beans are continuously ground in the grinding gap 20 into coffee powder, which exits the grinding gap through the outflow gap 20b on a continuous basis, thereby falling under the outflow gap 20b onto the edge region T of the carrier wheel 25, and that in such a way that the coffee powder initially falls in the proximity of the inner edge Ri onto the edge region T. During the rotation of the carrier wheel 25 around the rotary axis 6, the coffee powder having fallen onto the edge region T is conveyed through the spatial region 7 radially toward the outside in the direction of the outer edge Ra of the outer region T or in the direction of the second wall 6-2 and ultimately along the wall 6-2 until the coffee powder conveyed on the edge region T reaches the outflow channel 6-4 and can exit the spatial region 7 through the outflow channel 6-4.

In order to prevent that coffee powder can exit the spatial region 7 along the wall 6-2 upwardly (and not through the outflow channel 6-4 in an undesired way), the grinding device is provided with a seal ring 21, which is clamped between the second grinding element 15 and the second wall 6-2 of the housing 6 (FIGS. 2, 3A and 3B). The seal ring 21 can, for example, be designed as a flat ring and be made out of plastic.

In order to prevent that coffee powder can exit the spatial region 7 along the wall 6-2 downwardly in an undesired way, in the case of the grinding device 5 in accordance with FIG. 2, the seal ring 50 is provided.

In the present example in accordance with FIG. 2, the seal ring 50 has the function of preventing that the coffee powder coming from the spatial region 7 can penetrate into the intermediate region 47, which is formed between the outer ring 42 of the rolling bearing 40 and the carrier wheel 25, radially to the rotary axis R in the direction of the rotary axis 6.

The intermediate region 47 extends in the present example in accordance with FIG. 2 above the outer ring 42 both radially as well as axially to the rotary axis R. In this case, in particular, the intermediate region 47 extends in a ring-shaped manner around the rotary axis R in such a way that it extends above the outer ring 42 (in particular, in a projection of the outer ring 42 directed axially to the rotary axis R onto the carrier wheel 25) axially to the rotary axis R between a bottom boundary surface UF and a top boundary surface OF, wherein the bottom boundary surface UF of the intermediate region 47 is formed by a top surface region of the outer ring 42 and the top boundary surface OF of the intermediate region 47 is formed by a bottom surface region of the carrier wheel 25. In this case, the bottom boundary surface UF of the intermediate region 47 is accordingly arranged in a stationary manner with regard to the outer ring 42 and the top boundary surface OF of the intermediate region 47 is formed in a stationary manner with regard to the carrier wheel 25.

The seal ring 50 extends through the intermediate region 47 extending in a ring-shaped manner around the rotary axis R in such a way that it abuts both the bottom boundary surface UF of the intermediate region 47 as well as the top boundary surface OF of the intermediate region 47. As is evident, the seal ring 50 extends relative to the carrier wheel 25 and to the outer ring 42 of the rolling bearing 40 in such a way that the seal ring 50 seals the intermediate region 47, at least in terms entailing that the seal ring 50 mechanically blocks the intermediate region 47 against and advancement of coffee powder in such a way that coffee powder cannot cross the intermediate region 47 radially to the rotary axis R in the direction of the rotary axis R.

As is indicated in FIGS. 3A, 3B, 4A, 4B and 4C, the seal ring 50 is designed as an axial seal ring with a so-called "Y shape" in the present example. Accordingly, the seal ring 50 comprises a base section 51 extending in a ring-shaped manner around the rotary axis R, a first sealing lip 51A, which is connected to the base section 51 and extends from the base section 51 radially toward the outside, and a second sealing lip 51B, which is connected to the base section 51 and extends from the base section 51 radially toward the outside. Thereby, the first sealing lip 51A and the second sealing lip 51B are arranged relative to one another in such a way that the first sealing lip 51A has a spacing d to the second sealing lip 51B axially to the rotary axis R on a region distanced away from the base section 51 (viewed in a cross-section radially to the rotary axis R, the base section 51 together with the first sealing lip 51A and the second sealing lip 51B forms a structure with a shape, which is similar to the shape of the letter "Y", which, in this context, should justify the name "Y shape").

In the present example, the seal ring 50 is shaped and arranged in such a way that the first sealing lip 51A in the intermediate region 47 above the outer ring 42 in the region of a projection of the outer ring 42 directed axially to the rotary axis R onto the carrier wheel 25 is in contact with the carrier wheel 25 and the second sealing lip 51B in the intermediate region 47 is in contact with the outer ring 42 of the rolling bearing 40. For this purpose, in particular, the seal ring 50 can be shaped and arranged in such a way that the first sealing lip 51A on a side facing the carrier wheel 25 is in contact with the carrier wheel 25 at least along a surface region of the carrier wheel 25 extending in a ring-shaped manner around the rotary axis R, and/or the second sealing lip 51B on a side facing away from the carrier wheel 25 is in contact with the outer ring 42 of the rolling bearing 40 at least along a surface region extending in a ring-shaped manner around the rotary axis R on an upper side of the outer ring 42. The sealing effect of the seal ring 50 is greater, the greater the pressure or the pressing force is, with which the first lip 51A is pressed onto the carrier wheel 25 or the second sealing lip 51B is pressed onto the outer ring 42 of the rolling bearing 40.

As is indicated in FIG. 3B, the seal ring 50 in the present example is also shaped and arranged in such a way that a free space 52 is formed between the first sealing lip 51A and the second sealing lip 51B, which is radially limited toward the inside by the base section 51 and is open radially toward the outside toward the spatial region 7 designated for the coffee powder. In this case, coffee powder produced during operation of the grinding device 5 can advance from the spatial region 7 into the free space 52 formed between the first sealing lip 51A and the second sealing lip 51B. Due to the advancement of the coffee powder into the free space 52, however, in any case, the pressure or the pressing force, with which the first lip 51A is pressed onto the carrier wheel 25 or the second sealing lip 51B is pressed onto the outer ring 42 of the rolling bearing 40, becomes greater, which still improves the sealing effect of the seal ring 50.

The seal ring 50 can furthermore be designed in such a way that the base section 51 is arranged in such a way that it is in contact with the carrier wheel 25 and/or with the inner ring 41 of the rolling bearing 40. If the base section 51 is brought into contact with the inner ring 41 of the rolling bearing 40, this has the effect that the seal ring 50 covers the rolling bearing 40 on its side facing the carrier wheel 25 in such a way that the seal ring 50 touches both the outer ring 42 of the rolling bearing 40 on its side facing the carrier wheel 25 as well as the inner ring 41 of the rolling bearing 40 on its side facing the carrier wheel 25. In this arrangement, the seal ring 50 is suitable for blocking the advancement of coffee powder in the region of the rolling bearing 40 formed between the inner ring 41 and the outer ring 42, in which region the grooves 41A and 42A of the rolling bearing 40 and the rolling elements 43 are arranged.

In the example in accordance with FIGS. 2, 3A and 3B, the seal ring 50 is arranged in such a way that the base section 51 is in contact with the carrier wheel 25 and with the inner ring 41 of the rolling bearing 40. In this case, it is possible to affix the seal ring 50 on the carrier wheel 25 in such a way that the base section 51 is clamped between the inner ring 41 of the rolling bearing 40 and the carrier wheel 25, thereby being held in a stationary manner relative to the carrier wheel 25 and to the inner ring 41. In this case, the seal ring 50 is connected to the inner ring 41 of the rolling bearing 40 and the carrier wheel 25 in such a way that the inner ring 41 is rotated around the rotary axis R during operation of the grinding device 5 as soon as the ring gear 75, the carrier wheel 25, the first grinding element 11 and the conveying element 12 are rotated around the rotary axis R with the aid of the drive mechanism 65. In this case, the seal ring 50 moves along with the carrier wheel 25 in such a way that the second sealing lip 51B is moved relative to the outer ring 42 and, consequently, must slide relative to the surface of the outer ring 42.

As indicated in FIG. 4A, the seal ring 50 is provided with a plurality of bars 53, which—starting from the base section 51—project radially toward the inside and are connected as a single piece with the base section 51. The bars 53 offer a simple possibility to arrange the seal ring 50 on the carrier wheel 25 in such a way that the seal ring 50 cannot be rotated relative to the carrier wheel 25 around the rotary axis R. For this reason, it is, for example, possible to form appropriate recesses on the carrier wheel 25, which are formed complementary to the bars 53 and, into which the bars 53 can be inserted in a positive-locking manner in order to block a rotation of the seal ring 50 relative to the carrier wheel 25.

Figure 5A:
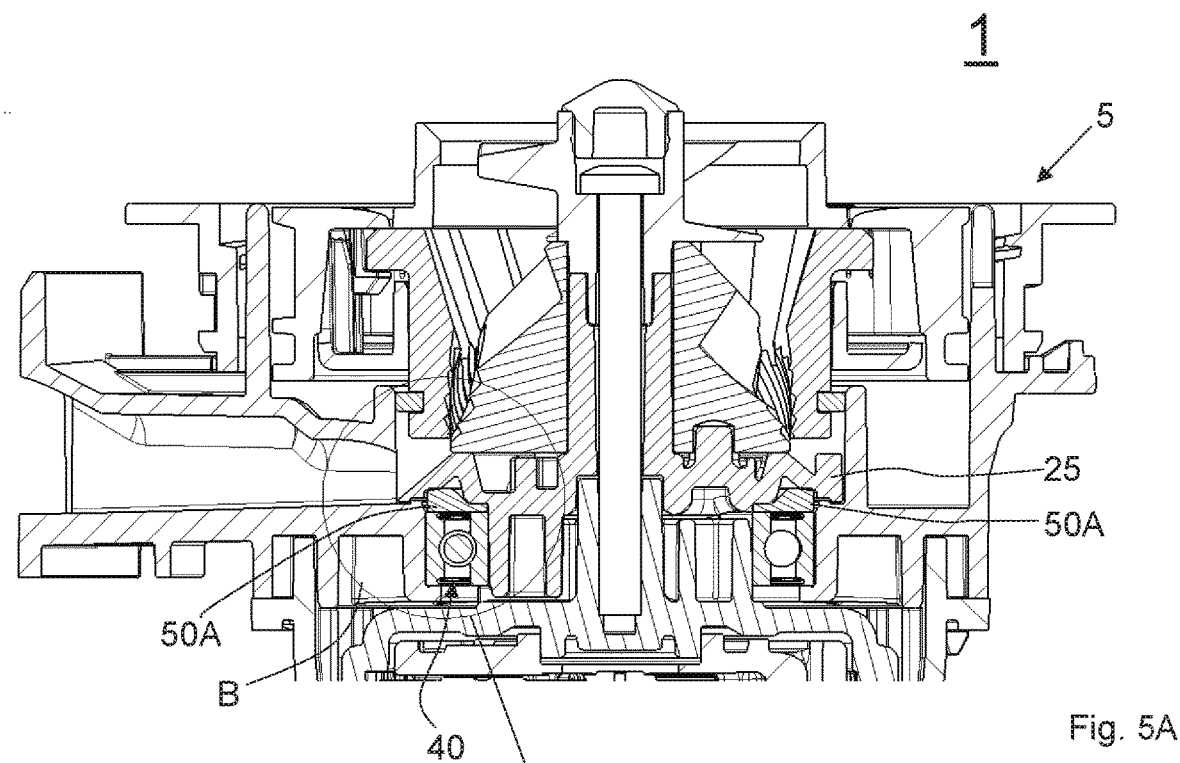
FIG. 5A the grinding device in accordance with FIG. 1 with a rolling bearing and a second embodiment of a seal ring, shown in a cross-section along the plane µl in accordance with FIG. 1.

The grinding device 5 in accordance with FIG. 5A differs from the grinding device 5 in accordance with FIG. 2 or 3A only due to the fact that seal ring 50 is replaced by 50A, which differs from seal ring 50 mainly with regard to the shape of its cross-section radially to the rotary axis R.

Figure 5B:
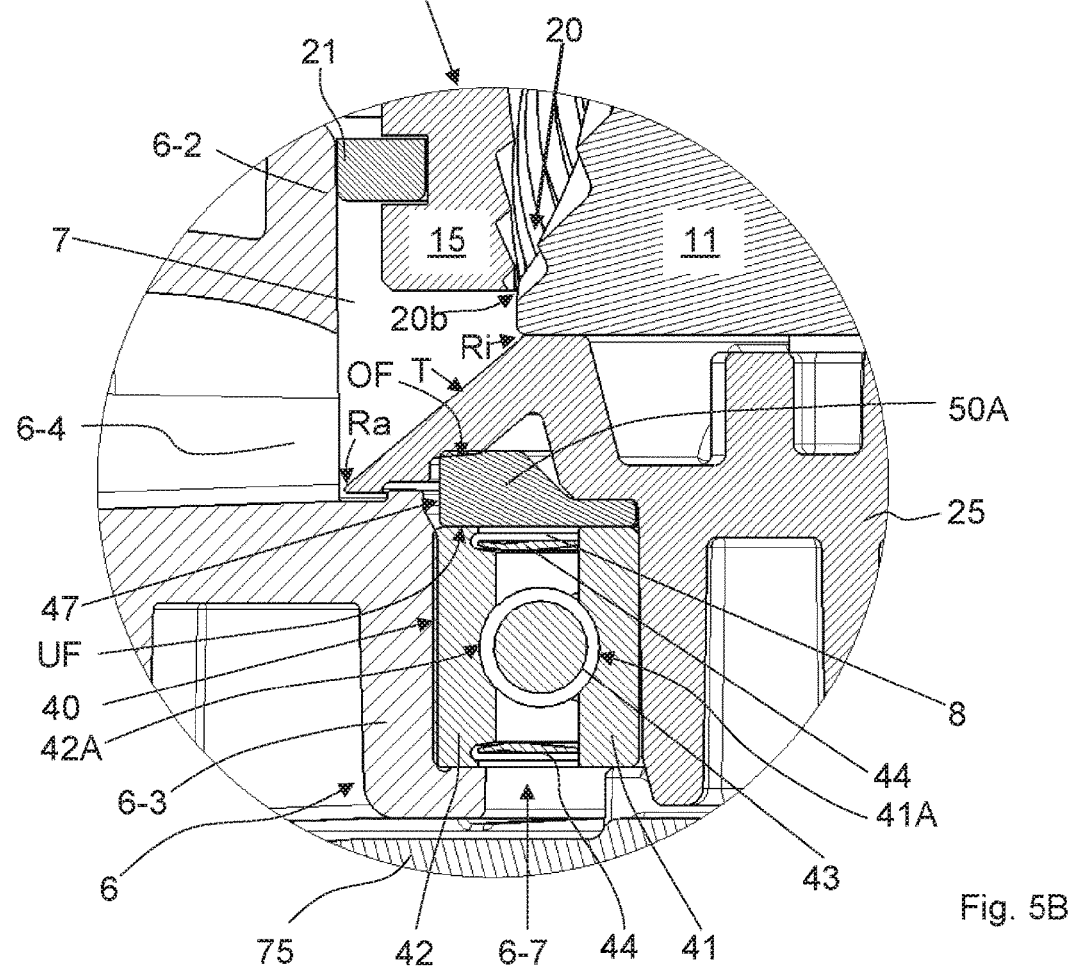
FIG. 5B a section from FIG. 5A, corresponding to a part of FIG. 5A, which is limited by a circular line provided with reference letter B in FIG. 5A in an enlarged view.
Figure 6A:
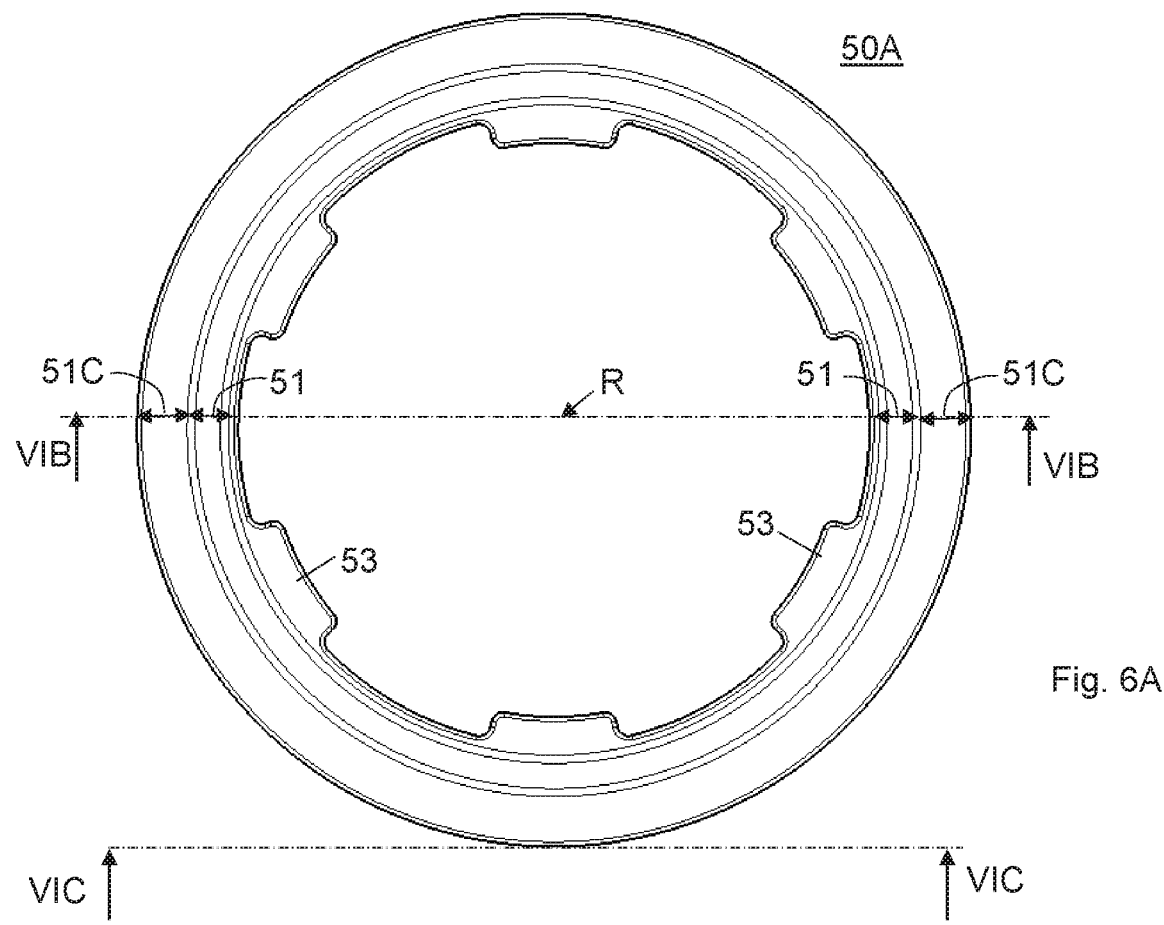
FIG. 6A the seal ring in accordance with FIG. 5A in a top view.
Figure 6B:
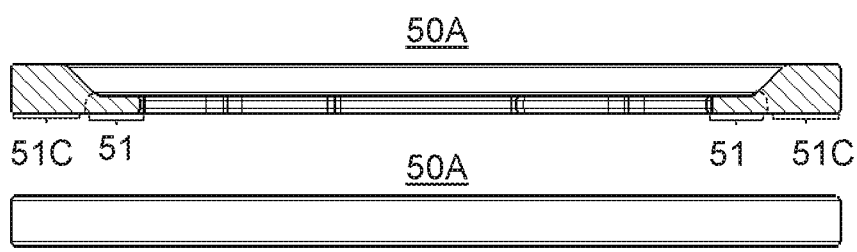
FIG. 6B the seal ring in accordance with FIG. 5A in a cross-section along the line VIB-VIB in accordance with FIG. 6A.
Figure 6C:
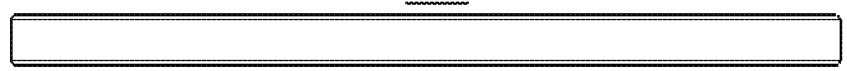
FIG. 6C the seal ring in accordance with FIG. 5A in a lateral view perpendicular to the line VIC-VIC in accordance with FIG. 6A.

As is indicated in FIGS. 5B, 6A and 6B in particular, the seal ring 50A comprises a base section 51 extending in a ring-shaped manner around the rotary axis R—just like seal ring 50. However, the seal ring 50 additionally comprises an outer section 51C, which extends in a ring-shaped manner around the rotary axis R on the side distanced away from the rotary axis R and is formed as a single piece together with the base section 51. While the base section 51 radially extends to the rotary axis R in such a way that its extension axially to the rotary axis R is essentially constant, the outer section 51C radially extends to the rotary axis R in such a way that its extension axially to the rotary axis R as a function of the spacing from the rotary axis is not constant, but becomes greater radially toward the outside. The outer section 51C therefore has a greater extension axially to the rotary axis 6 at least at its edge distanced away from the rotary axis R as the base section 51.

As is furthermore indicated in FIGS. 5B, 6A and 6B, the seal ring 50A is placed in the grinding device 5 in such a way that the seal ring 50 of the base section 51 is clamped between the inner ring 41 of the rolling bearing 40 and the carrier wheel 25, thereby being held in a stationary manner relative to the carrier wheel 25 and to the inner ring 41. The outer section 51C extends through the intermediate region 47 formed between the outer ring 42 of the rolling bearing 40 and the carrier wheel 25 axially to the rotary axis in such a way that the outer section 51C seals the intermediate region 47.

FIGS. 7A and 7B show a grinding device 5, which shows a variant of the grinding device 5 in accordance with FIG. 2 or 3A and 3B, wherein the grinding device 5 in accordance with FIGS. 7A and 7B and the grinding device 5 in accordance with FIG. 2 or 3A and 3B essentially differ with regard to the arrangement of the seal ring 50 relative to the outer ring 42 of the rolling bearing 40. The grinding element 5 in accordance with FIGS. 7A and 7B and the grinding device 5 in accordance with FIG. 2 or 3A and 3B respectively comprises one rolling bearing 40 with an inner ring 41 and an outer ring 42, wherein the rolling bearing 40 in the case of the grinding device 5 in accordance with FIGS. 7A and 7B and in the case of a grinding element 5 in accordance with FIG. 2 or 3A and 3B is respectively arranged in an identical manner with regard to the housing 6 and with regard to the carrier wheel 25, the first grinding element 11 and the rotary axis R. In particular, the outer ring 42 of the rolling bearing both in the case of grinding device 5 in accordance with FIGS. 7A and 7B as well as in the case of the grinding device in accordance with FIG. 2 or 3A and 3B are each arranged in such a way that a radially external surface of the outer ring 42 abuts the third wall 6-3 of the housing 6.

In the case of the grinding device 5 in accordance with FIGS. 7A and 7B and in the case of the grinding device 5 in accordance with FIG. 2 or 3A and 3B, the seal ring 50 has the same shape respectively and, in the case of the grinding device in accordance with FIGS. 7A and 7B and in the case of the grinding device 5 in accordance with FIG. 2 or 3A and 3B, it is identically arranged respectively to the extent that the base section 51 of the seal ring 50 is respectively in contact with the carrier wheel 25 and with the inner ring 41 of the rolling bearing 40, for example in such a way that the base section 51 is clamped between the inner ring 41 of the rolling bearing 40 and the carrier wheel 25, thereby being held in a stationary manner relative to the carrier wheel 25 and to the inner ring 41.

The grinding device 5 in accordance with FIGS. 7A and 7B and the grinding device 5 in accordance with FIG. 2 or 3A and 3B differ with regard to the arrangement of the rolling bearing and of the seal ring 50 essentially by means of the fact that, in the case of the grinding device 5 in accordance with 7A and 7B, a flat ring disk 45 is placed above the outer ring 40, which ring disk 45 extends in a ring-shaped manner around the rotary axis R. The ring disk 45 essentially extends parallel to a plane that is perpendicular to the rotary axis R in such a way that the ring disk 45 lies on a top surface of the outer ring 42 and, furthermore, an outer circumferential surface of the ring disk 45 abuts the third wall 6-3 of the housing 6.

In the case of the grinding device 5 in accordance with FIGS. 7A and 7B, an upper surface of the outer ring 42 is covered by the ring disk 45 accordingly. The ring disk 45 can be shaped in such a way that the ring disk 45, if it (as shown in FIGS. 7A and 7B) is placed on the top surface of the outer ring 42, is clamped on the outer periphery of the ring disk on the third wall 6-3 of the housing 6 so that the outer ring 42 of the rolling bearing 40 can be fixed at its position on the wall 6-3 with the aid of the ring disk 45 (e.g. tightly clamped).

In the case of the grinding device 5 in accordance with FIGS. 7A and 7B, between the outer ring 42 of the rolling bearing and the carrier wheel 25, an intermediate region 47 is arranged, which extends above the outer ring 42 and, in particular, above the ring disk 45 in a ring-shaped manner around the rotary axis R and axially to the rotary axis R between a bottom boundary surface UF and a top boundary surface OF. The intermediate region 47 extends in the present example in a ring-shaped manner around the rotary axis R in such a way that it extends above the outer ring 42 and above the ring disk 45 (in particular, in a projection of the outer ring 42 directed axially to the rotary axis R onto the carrier wheel 25) axially to the rotary axis R between a bottom boundary surface UF and a top boundary surface OF, wherein the bottom boundary surface UF of the intermediate region 47 is formed by a top surface region of the ring disk and the top boundary surface OF of the intermediate region 47 is formed by a bottom surface region of the carrier wheel 25. In this case, the bottom boundary surface UF of the intermediate region 47 is accordingly arranged in a stationary manner with regard to the ring disk 45 and the top boundary surface OF of the intermediate region 47 is formed in a stationary manner with regard to the carrier wheel 25.

In the present example, the seal ring 50 is shaped and arranged in such a way that the first sealing lip 51A in the intermediate region 47 above the outer ring 42 in the region of a projection of the outer ring 42 directed axially to the rotary axis R onto the carrier wheel 25 is in contact with the carrier wheel 25 and the second sealing lip 51B in the intermediate region 47 is in contact with the ring disk 45 (but not with the outer ring 42 of the rolling bearing 40).

Preferably, the ring disk 45 can be made of a material, which ensures a low level of sliding friction between the ring disk 45 and the seal ring 50. In this way, wear of the seal ring can be reduced or minimized for the case that the carrier wheel 25 rotates together with the first grinding element 11 around the rotary axis R.

As indicated in FIGS. 3A, 3B, 5B and 7B, both the seal ring 50 as well as the seal ring 50A are arranged in such a way that seal ring 50 or seal ring 50A separates a spatial region 8 extending under the carrier wheel 25 from the spatial region 7 designated for the coffee powder in such a way that coffee powder cannot advance into the spatial region 8.

The seal rings 50 and 50A can be made out of a plastic material (e.g. Teflon) for example.

It is pointed out that the above-mentioned rolling bearing can be replaced by a rolling bearing of another type, for example, by a radial bearing or, preferably, by combined axial/radial bearing, which can be stressed both radially as well as axially with regard to the rotary axis R, for example, a deep groove ball bearing, cylindrical roller bearing, tapered roller bearing, radial roller bearing, spherical roller bearing or needle bearing.

Furthermore, the first grinding element 11 and the second grinding element 15 can be replaced by disk-shaped grinding elements of a disk grinder (as disclosed in EP 2 984 973 A1).

The invention claimed is:

1. A grinding device for grinding coffee beans, which comprises:
    a first grinding element and a second grinding element, wherein the first grinding element is configured to be rotated relative to the second grinding element around a rotary axis in such a way that coffee beans are enabled to be ground between the first grinding element and the second grinding element into a coffee powder;
    a carrier wheel, which is configured to be rotated around the rotary axis together with the first grinding element and is arranged in such a way that, during a rotation of the carrier wheel around the rotary axis, the coffee powder on an edge region of the carrier wheel is enabled to be conveyed through a first spatial region designated for the coffee powder to an outflow channel for outputting the coffee powder out of the grinding device;
    a housing, which surrounds the first grinding element, the second grinding element, the carrier wheel and the first spatial region designated for the coffee powder and comprises the outflow channel, wherein the second grinding element is arranged in a stationary manner relative to the housing;
    a pivot bearing for mounting the first grinding element and/or the carrier wheel so that the first grinding element and the carrier wheel are configured to be rotated around the rotary axis relative to the housing, wherein the pivot bearing comprises a rolling bearing, which comprises an inner ring extending around the rotary axis, an outer ring extending around the rotary axis and a plurality of rolling elements arranged between the inner ring and the outer ring, wherein the outer ring is arranged in a stationary manner on the housing spaced away from the carrier wheel so that an intermediate region extending in a ring-shaped manner around the rotary axis is formed between the carrier wheel and the outer ring, which intermediate region extends above the outer ring of the rolling bearing axially to the rotary axis between a bottom boundary surface and a top boundary surface in a projection of the outer ring directed axially to the rotary axis onto the carrier wheel, wherein the bottom boundary surface of the intermediate region is formed in a stationary manner with regard to the outer ring and the top boundary surface of the intermediate region is formed in a stationary manner with regard to the carrier wheel and wherein the first grinding element and the carrier wheel are arranged in a stationary manner relative to the inner ring of the rolling bearing and the inner ring is supported on the outer ring by means of the rolling elements so that the first grinding element, the carrier wheel and the inner ring are configured to be rotated together around the rotary axis;

a seal element being designed as an axial seal ring, which extends in a ring-shaped manner around the rotary axis and is designed to prevent the coffee powder from advancing from the first spatial region designated for the coffee powder into a second spatial region under the carrier wheel;

wherein the axial seal ring, which extends through the intermediate region extending in a ring-shaped manner around the rotary axis in such a way that the axial seal ring abuts both the bottom boundary surface of the intermediate region as well as the top boundary surface of the intermediate region in a projection of the outer ring directed axially to the rotary axis onto the carrier wheel.

2. The grinding device according to claim 1, wherein the rolling bearing is designed as a radial bearing, which is configured to at least be radially stressed with regard to the rotary axis, or the rolling bearing is designed as a combined axial/radial bearing, which is configured to be both radially as well as axially stressed with regard to the rotary axis.

3. The grinding device according to claim 1, wherein the rolling bearing is designed as a deep groove ball bearing, cylindrical roller bearing, tapered roller bearing, radial roller bearing, spherical roller bearing or needle bearing.

4. The grinding device according to claim 1, wherein the axial seal ring is in contact with the carrier wheel and the outer ring of the rolling bearing.

5. The grinding device according to claim 1, wherein the axial seal ring is shaped and arranged in such a way that the axial seal ring is in contact with the outer ring of the rolling bearing at least along a surface region of the outer ring extending in a ring-shaped manner around the rotary axis.

6. The grinding device according to claim 1, wherein the axial seal ring extends radially to the rotary axis in such a way that the axial seal ring comprises a section extending in a ring-shaped manner around the rotary axis, which is in contact with the inner ring of the rolling bearing or both with the inner ring of the rolling bearing as well as with the carrier wheel.

7. The grinding device according to claim 6, wherein the axial seal ring is in contact with the inner ring of the rolling bearing at least along a surface region of the inner ring extending in a ring-shaped manner around the rotary axis.

8. The grinding device according to claim 1, wherein the axial seal ring comprises: a base section extending in a ring-shaped manner around the rotary axis, a first sealing lip, which is connected to the base section and extends from the base section radially toward the outside, and a second sealing lip, which is connected to the base section and extends from the base section radially toward the outside, wherein the first sealing lip and the second sealing lip are arranged relative to one another in such a way that the first sealing lip has a spacing to the second sealing lip axially to the rotary axis on a region distanced away from the base section.

9. The grinding device according to claim 8, wherein the first sealing lip is arranged in such a way that it is in contact with the carrier wheel, and the second sealing lip is arranged in such a way that it is in contact with the outer ring of the rolling bearing.

10. The grinding device according to claim 9, wherein the first sealing lip is in contact with the carrier wheel at least along a surface region of the carrier wheel extending in a ring-shaped manner around the rotary axis, and/or the second sealing lip is arranged in such a way that it is in contact with the outer ring of the rolling bearing at least along a surface region of the outer ring extending in a ring-shaped manner around the rotary axis.

11. The grinding device according to claim 8, wherein a free space is formed between the first sealing lip and the second sealing lip, which is radially limited toward the inside from the base section and is open radially toward the outside to the first spatial region designated for the coffee powder.

12. The grinding device according to claim 8, wherein the base section is arranged in such a way that it is in contact with the carrier wheel and/or with the inner ring of the rolling bearing.

13. The grinding device according to claim 1, wherein the axial seal ring is arranged in a stationary manner with regard to the carrier wheel.

14. The grinding device according to claim 1, wherein the axial seal ring is made out of a plastic material.

15. The grinding device according to claim 1, further comprising a drive mechanism for generating a rotational movement of the inner ring of the rolling bearing, of the first grinding element and/or of the carrier wheel around the rotary axis, wherein the drive mechanism is arranged under the carrier wheel.

* * * * *

UNITED STATES PATENT AND TRADEMARK OFFICE
CERTIFICATE OF CORRECTION

| | |
|---|---|
| PATENT NO. | : 11,389,029 B2 |
| APPLICATION NO. | : 16/439179 |
| DATED | : July 19, 2022 |
| INVENTOR(S) | : Ullmann et al. |

It is certified that error appears in the above-identified patent and that said Letters Patent is hereby corrected as shown below:

In the Claims

In Claim 1, Line 60 (Line 9 of Column 23) please change "the axial seal ring, which extends" to correctly read: --the axial seal ring extends--

Signed and Sealed this
Thirteenth Day of September, 2022

*Katherine Kelly Vidal*

Katherine Kelly Vidal
*Director of the United States Patent and Trademark Office*